United States Patent
Alfano et al.

(10) Patent No.: US 10,681,072 B2
(45) Date of Patent: Jun. 9, 2020

(54) METHOD AND SYSTEM FOR USER PLANE TRAFFIC CHARACTERISTICS AND NETWORK SECURITY

(71) Applicant: Blackberry Limited, Waterloo (CA)

(72) Inventors: Nicholas Patrick Alfano, Vancouver (CA); Axel Ferrazzini, Uccle (BE); Dake He, Waterloo (CA)

(73) Assignee: BlackBerry Limited, Waterloo (CA)

(*) Notice: Subject to any disclaimer, the term of this patent is extended or adjusted under 35 U.S.C. 154(b) by 155 days.

(21) Appl. No.: 15/692,836

(22) Filed: Aug. 31, 2017

(65) Prior Publication Data
US 2019/0068625 A1 Feb. 28, 2019

(51) Int. Cl.
| H04L 29/06 | (2006.01) |
| H04L 29/08 | (2006.01) |
| H04L 12/24 | (2006.01) |
| H04L 12/26 | (2006.01) |
| H04W 12/00 | (2009.01) |
| H04W 12/12 | (2009.01) |

(52) U.S. Cl.
CPC ........ *H04L 63/1425* (2013.01); *H04L 41/069* (2013.01); *H04L 43/062* (2013.01); *H04L 43/0876* (2013.01); *H04L 43/16* (2013.01); *H04L 63/1408* (2013.01); *H04L 67/22* (2013.01); *H04W 12/005* (2019.01); *H04W 12/0013* (2019.01); *H04W 12/12* (2013.01); *H04L 63/0263* (2013.01); *H04L 63/20* (2013.01)

(58) Field of Classification Search
CPC ... H04L 63/1425; H04L 67/22; H04L 41/069; H04L 43/16; H04L 63/0263; H04L 63/20; H04L 43/0876
See application file for complete search history.

(56) References Cited

U.S. PATENT DOCUMENTS

| 6,907,243 B1 * | 6/2005 | Patel ................... H04W 52/143 455/442 |
| 2017/0230832 A1 * | 8/2017 | Ophir ...................... H04W 4/70 |
| 2017/0264619 A1 * | 9/2017 | Narayanaswamy .. H04L 63/104 |

FOREIGN PATENT DOCUMENTS

WO    2016119822 A1    8/2016

OTHER PUBLICATIONS

3GPP, TS 33.401 v15.0.0, "3GPP System Architecture Evolution (SAE); Security architecture", Jun. 14, 2017.
3GPP, TS 33.501 v0.3.0, "Security architecture and procedures for 5G System", Aug. 21, 2017.

(Continued)

*Primary Examiner* — Tri M Tran
(74) *Attorney, Agent, or Firm* — Moffat & Co

(57) ABSTRACT

A method at a network element for monitoring user plane traffic for a user equipment, the method including configuring a set of characteristics and a range of values for each of the set of characteristics for user plane traffic between the user equipment and the network element; monitoring user plane traffic for the user equipment at the network element, the monitoring determining whether at least one characteristic of the user plane traffic falls outside of the configured range of a values, resulting in a characteristic violation; and if the at least one characteristic of the user plane traffic falls outside the configured range of a values, performing an action resulting from the characteristic violation.

19 Claims, 19 Drawing Sheets

(56) References Cited

OTHER PUBLICATIONS

3GPP, TR 23.799 v14.0.0, "Study on Architecture for Next Generation System", Dec. 16, 2016.
3GPP, TR 33.899 v1.3.0, "Study on the security aspects of the next generation system", Aug. 21, 2017.
3GPP, TS 23.203 v14.4.0, "Policy and charging control architecture", Jun. 12, 2017.
3GPP, TS 23.401 v15.0.0, "General Packet Radio Service (GPRS) enhancements for Evolved Universal Terrestrial Radio Access Network (E-UTRAN) access", Jun. 12, 2017.
3GPP, TR 22.891 v14.2.0, "Study on New Services and Markets Technology Enablers", Sep. 30, 2016.
3GPP, TR 22.861 v14.1.0, "FS_SMARTER—massive Internet of Things", Sep. 30, 2016.
3GPP, TS 33.402 v14.2.0, "3GPP System Architecture Evolution (SAE); Security aspects of non-3GPP accesses", Jun. 14, 2017.
3GPP, TS 23.682 v15.1.0, "Architecture enhancements to facilitate communications with packet data networks and applications", Jun. 12, 2017.
3GPP, TS 36.323 v14.3.0, "Evolved Universal Terrestrial Radio Access (E-UTRA); Packet Data Convergence Protocol (PDCP) specification", Jun. 23, 2017.
3GPP, TS 24.301 v14.4.0, "Non-Access-Stratum (NAS) protocol for Evolved Packet System (EPS); Stage 3", Jun. 16, 2017.
3GPP, TS 36.331 v14.3.0, "Evolved Universal Terrestrial Radio Access (E-UTRA); Radio Resource Control (RRC); Protocol specification", Jul. 13, 2017.
3GPP, TS 33.102 v14.1.0, "3G security; Security architecture", Mar. 16, 2017.
3GPP, TS 31.102 v14.3.0, "Characteristics of the Universal Subscriber Identity Module (USIM) application", Jun. 16, 2017.
3GPP, TS 32.251 v14.3.0, "Telecommunication management; Charging management; Packet Switched (PS) domain charging", Jun. 14, 2017.
3GPP, TS 23.060 v14.4.0, "General Packet Radio Service (GPRS); Service description; Stage 2", Jun. 12, 2017.
Wikipedia Contributors "Differentiated services," Wikipedia, The Free Encyclopedia, https://en.wikipedia.org/w/index.php?title=Differentiated_services&oldid=799901648 (accessed Jun. 22, 2017).
Wikipedia Contributors, "Deep packet inspection," Wikipedia, The Free Encyclopedia, https://en.wikipedia.org/w/index.php?title=Deep_packet_inspection&oldid=799474873 (accessed Jun. 22, 2017).
3GPP, TS 23.303 v15.0.0, "Proximity-based services (ProSe); Stage 2", Jun. 12, 2017.
International Searching Authority, International Search Report and Written Opinion for International Application No. PCT/CA2018/051031, dated Nov. 30, 2018.

* cited by examiner

METHOD AND SYSTEM FOR USER PLANE TRAFFIC CHARACTERISTICS AND NETWORK SECURITY

FIELD OF THE DISCLOSURE

The present disclosure relates to user plane communications in a mobile network, and in particular relates to network security with regards to user plane communications.

BACKGROUND

Integrity and confidentiality of traffic between a User Equipment (UE) and Network may create a cost for processing power, and may also reduce the battery life, at a UE. Operating with no security may enable the deployment of devices with longer battery life and less processing power.

However, sending unprotected communications over the air can introduce security risks to the network and to the UE, including but not limited to eavesdropping; originator spoofing; injection of invalid data; or denial of service (DoS) attacks.

Unprotected connections may allow for possible corruption of the data on route, which may have an impact on the network infrastructure or performance.

Due to such risks, network operators are hesitant to allow connections to their network that are unprotected.

BRIEF DESCRIPTION OF THE DRAWINGS

The present disclosure will be better understood with reference to the drawings, in which.

DETAILED DESCRIPTION OF THE DRAWINGS

Figure 1:
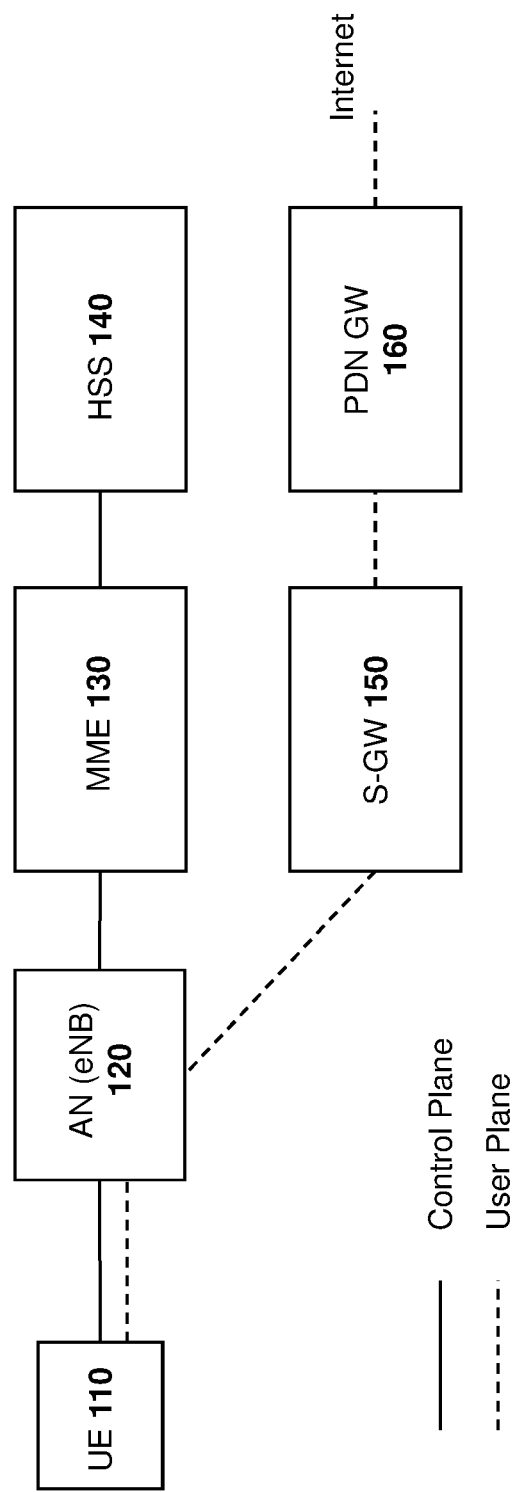
FIG. 1 is a block diagram showing an example evolved packet core network architecture.

The present disclosure provides a method at a network element for monitoring user plane traffic for a user equipment, the method comprising: configuring a set of characteristics and a range of values for each of the set of characteristics for user plane traffic between the user equipment and the network element; monitoring user plane traffic for the user equipment at the network element, the monitoring determining whether at least one characteristic of the user plane traffic falls outside of the configured range of a values, resulting in a characteristic violation; and if the at least one characteristic of the user plane traffic falls outside the configured range of a values, performing an action resulting from the characteristic violation.

The present disclosure further provides a network element for monitoring user plane traffic for a user equipment, the network element comprising: a processor; and a communications subsystem, wherein the network element is configured to: configure a set of characteristics and a range of values for each of the set of characteristics for user plane traffic between the user equipment and the network element; monitor user plane traffic for the user equipment at the network element, the monitoring determining whether at least one characteristic of the user plane traffic falls outside of the configured range of a values, resulting in a characteristic violation; and if the at least one characteristic of the user plane traffic falls outside the configured range of a values, perform an action resulting from the characteristic violation.

The present disclosure further provides a computer readable medium for storing program instructions for monitoring user plane traffic for a user equipment, which when executed by a processor of a network element cause the network element to: configure a set of characteristics and a range of values for each of the set of characteristics for user plane traffic between the user equipment and the network element; monitor user plane traffic for the user equipment at the network element, the monitoring determining whether at least one characteristic of the user plane traffic falls outside of the configured range of a values, resulting in a characteristic violation; and if the at least one characteristic of the user plane traffic falls outside the configured range of a values, perform an action resulting from the characteristic violation.

A wide array of user equipment (UE) types will use fifth generation (5G), or beyond, services. Such UEs may include Internet of Things (IoT) devices, some of which may have very limited processing power and memory. As such, a one size fits all security mechanism will not serve all device types well and can be quite costly relative to the market for which the device is targeted.

Therefore, in accordance with the embodiments below, there is provided a mechanism primarily designed to support IoT devices connecting to wide-area cellular networks, where the security overheads for transmission are reduced, typically resulting in lower processing power requirements and longer battery life for the device.

While the embodiments described below are provided for 5G networks and devices, in some cases the solutions provided could be used with fourth generation networks or could be used with future networks beyond 5G. The present disclosure is therefore not limited to 5G networks and devices.

Reference is now made to FIG. 1, which shows an example Evolved Packet Core network in a 4G network. In the embodiment of FIG. 1, a UE 110 communicates over the network using an Access Node (AN) 120. The AN 120 is typically an evolved Node B (eNB).

AN 120 communicates with an Evolved Packet Core (EPC), which in part comprises a Mobility Management Entity (MME) 130, Home Subscriber Server (HSS) 140, Serving Gateway (S-GW) 150 and Packet Data Network (PDN) Gateway (P-GW) 160.

MME 130 controls operation of device 110 through signaling messages using HSS 140.

S-GW 150 acts as a router and forwards data to the P-GW 170 over an S5/S8 interface.

P-GW 160 provides the interface between the 4G network and other networks such as the Internet or private networks. P-GW 160 is connected to a public data network PDN over an SGi interface.

Those skilled in art will appreciate that wireless network may be connected to other systems, possibly including other networks, not explicitly shown in FIG. 1.

In the embodiment of FIG. 1, control plane traffic flows between the UE 110, AN 120, MME 130 and HSS 140.

Further, user plane traffic flows between UE 110, AN 120, SGW 150 and P-GW 160.

Figure 2:
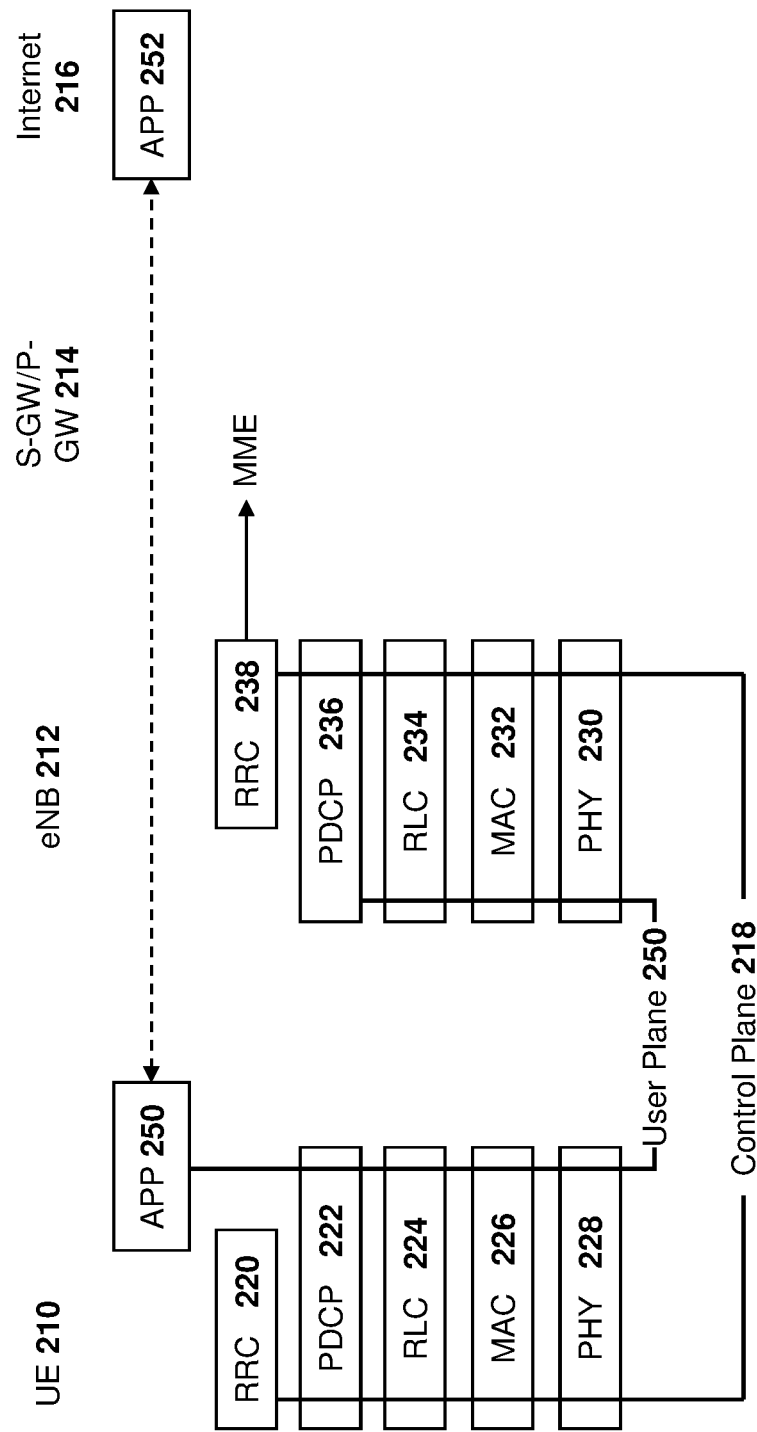
FIG. 2 is a block diagram showing user plane confidentiality as provided by the packet data control protocol layer in the evolved packet core.

Specifically, reference is made to FIG. 2, which shows communications between the various layers at the UE 210 and eNB 212.

In particular, for control plane traffic 218, communication from the UE proceeds from the Radio Resource Control (RRC) layer 220, through the Packed Data Convergence Protocol (PDCP) layer 222, Radio Link Control (RLC) layer 224, Message Authentication Control (MAC) layer 226 and to the Physical (PHY) layer 228.

Similarly, at the eNB 212, the control plane data from the UE 210 proceeds through a PHY layer 230, MAC layer 232, RLC layer 234, PDCP layer 236 and to RRC layer 238. It may then flow to the MME.

For user plane traffic 240, the traffic flows to and from an application (APP) layer 250 at UE 210. The traffic may flow through PDCP layer 222, RLC layer 224, MAC layer 226 and to PHY layer 228.

At the eNB 212, the traffic flows through PHY layer 230, MAC layer 232, RLC layer 234 to PDCP 236. It may then be forwarded through the S-GW/P-GW 214 to the Internet 216. At a server reached through Internet 216, an application layer 252 may receive the user plane traffic 250.

In 5G networks, there will likely be numerous options for a UE to select the type of service it wishes to receive from a network. One element of the options that can be negotiated between the UE and a network may be the type of security that is applied to the service. These security features, possibly occurring at the radio bearer interface between the UE and a next Generation Node B (gNB) might be, for example, the use or non-use of integrity protection, the use or non-use of confidentiality (encryption), the selection of integrity algorithm and the selection of encryption algorithm.

The security applied to the UE to Network connection may be based at least in part around the mutual authentication of the UE device and UE user to verify they are who they claim to be and have permission to access the network. This part of the connection security is called mutual authentication. The protection of the communications exchanged between the UE and Network from manipulation or spoofing is referred to as integrity. Integrity may primarily be achieved using, for example, keyed hashes or signatures. The protection of the communications between the UE and Network from eavesdropping is referred to as confidentiality. Confidentiality may be primarily achieved using, for example, encryption. Confidentiality and integrity are the two basic components which when combined provide a highly secure communications link from source to destination.

In Long Term Evolution (LTE), also referred to 4G, and 5G networks integrity and confidentiality operation over the radio interface (over-the-air) are defined for the Control Plane and User Plane traffic to ensure the security of communications across this interface. Table 1 below shows the defined options for application of integrity and confidentiality in 4G and 5G.

TABLE 1

UE to Network security configurations for 4G and 5G

| Technology/ Traffic | Control Plane (UE-Network) | | User Plane (UE-Network) | |
|---|---|---|---|---|
| Type | Integrity | Confidentiality | Integrity | Confidentiality |
| 4G | Mandatory | Optional* | Forbidden | Optional |
| 5G | Mandatory | Optional* | Optional | Optional |

Notes
*Confidentiality is recommended

In the example of Table 1, integrity ensures the UE is the expected entity, and confidentiality indicates that the communications are encrypted to prevent eavesdroppers from reading the communication.

4G confidentiality and integrity is for example provided for in the Third Generation Partnership Project (3GPP) Technical Specification (TS) 33.401, "3GPP System Architecture Evolution (SAE); Security architecture", for example as provided in v. 15.0.0, June 2017. In particular, clause 5.1.4.1 provides for such integrity and confidentiality. Sections of 3GPP TS 33.401 are reproduced in Appendix A below.

5G confidentiality and integrity is for example provided for in 3GPP TS 33.501, "Security architecture and procedures for 5G System", for example as provided in v. 0.2.0, June 2017. Further, 3GPP Technical Report (TR) 33.899, "Study on the security aspects of the next generation system" also provides for such confidentiality and integrity.

In current 3GPP networks, including second generation (2G), third generation (3G) and LTE, integrity and confidentiality protection is achieved by use of a shared key (K) between the UE and Network. For example, authentication details for an Enhanced Packet System (EPS) are found in 3GPP TS 33.401, section 6.1, reproduced in Appendix B of the present disclosure.

Generally, the security applied to a UE to Network radio connection is the strongest security that can be supported mutually by the UE and Network equipment. In particular, the Network would attempt to use the strongest security possible to offer protection to the UE as well as protect the network equipment from attack.

User Plane confidentiality is provided by encryption at the PDCP layer 222 or 236. It is at the PDCP layer 222 or 236 where the use or non-use of confidentiality for the User Plane is realized. The decision to configure the PDCP layer to use or not use confidentiality may be made at the RRC layer 238 (in the eNB 212) or some other equipment, possibly the MME. The PDCP layer 222 or 236 supports User Data integrity using MAC, where each message arriving at the PDCP layer would be integrity protected.

Typically, higher layer protocols (above the PDCP layer) apply security to the communication transmission, although this is not necessary in order for the embodiments of the present disclosure. The higher layer security could be for example Transport Layer Security (TLS) or Datagram TLS (DTLS), Secure Socket Layer (SSL), Hypertext Transfer Protocol Secure (HTTPS), and Internet Protocol Security (IPSec). Further, if security at the higher layers is not applied then the embodiments of the present disclosure could be used to provide improved security to those unprotected transmissions.

Based on the above, the security impact on the network infrastructure and user data traffic based on the selection of the optional aspects of the User Plane usage of integrity and confidentiality shown in Table 1 are addressed by the embodiments described below.

3GPP TR 23.799, "*Study on Architecture for Next Generation System*", at clause 5.10: Policy Framework, states;
In the EPC system, network functions are configurable via operator policies. This trend is expected to continue into the Next Generation System. These operator policies help shape a variety of network behaviors such as related to:
Quality of Service (QoS) Enforcement.
Charging Control.
Gating.
Traffic Routing.
Congestion Management.
Service Chaining.
Network (e.g. PLMN) Selection.
Access Type Selection.
Roaming.
Mobility.
Policies related to group of users.
Third party service handling.
The provisioning and enforcement of these policies can happen in:
UE.
Control Plane entities.
User Plane entities.

Therefore, in some cases, the embodiments of the present disclosure may be part of the Policy Framework for 5G by providing oversight on the traffic characteristics of a UE.

The present disclosure provides a network operator with more information about the use of a network service by a UE. Provided the observed transmissions comply with the described behavior of a UE, the network operator should have confidence the traffic from the UE has not been modified on-route or that the UE has not been tampered.

Specifically, good security is the combination of integrity and confidentiality on a data stream. Removing one or the other or both impacts aspects of security.

For example, integrity can protect the receiver from the tampering of the data payload, since the data payload or a portion of it is used to generate the integrity signature. Integrity can also protect against DoS attacks as additional or duplicated packets arriving at a destination would not pass the Integrity check. Integrity also ensures the connection was not hijacked by an attacker spoofing as the true originator/user of the data connection.

Confidentiality protects the data from eavesdropping and can provide some tampering protection. For example, a packet that failed the Confidentiality check because the data payload had been changed could be discarded.

Table 2 below illustrates a combination of security features and how they can protect against or expose a vulnerability. Tampering includes both the data payload and/or the Protocol Control Information (PCI or packet metadata). When confidentiality is disabled and it is not applied at a higher layer, all PCI is exposed, including critical information such as source and destination Internet Protocol (IP) address.

TABLE 2

Impact of Security Options on Over the Air Security

| Security feature/Vulnerability | Eaves-dropping | Tampering | Denial of Service |
|---|---|---|---|
| Integrity ON; Confidentiality ON | Secure | Secure | Secure |
| Integrity ON; Confidentiality OFF | Exposed | Risk (user data) | Risk? |
| Integrity OFF; Confidentiality ON | Secure | Risk (meta data) | Exposed |
| Integrity OFF; Confidentiality OFF | Exposed | Exposed | Exposed |

Certain types of devices, particularly those employed in IoT type applications, may not require a great amount of security protection if the data they are exchanging is of low value. This can be the case for many IoT types of devices, where the cost of the device and its lifetime in service are larger issues than the value of an individual data exchange. Some examples of data and application that may have low value include:
Metering data (parking meters)
Weather data collection
Some home monitoring applications (in-house temperature)
Location tracking of slow moving objects (log boom)
These devices would normally be running a specific application which connects to only one destination and may also operate a security protocol at a higher layer or in the application itself. Therefore, radio layer security may be an additional, unnecessary cost.

For 5G, integrity protection for user data is optional at the radio layer. Therefore it is possible to have a user data session between UE and eNB operating with no integrity and no confidentiality protection.

Therefore, the present disclosure addresses the problem where low cost devices with minimal built-in security functions supporting integrity and confidentiality can be allowed to connect to a Public Land Mobile Network (PLMN) and not introduce security risks to the network infrastructure or other network users. It specifically addresses the scenario where no security (integrity off, confidentiality off) is applied to the OTA transmissions. The security issues addressed by the present disclosure apply to the user plane and include tampering, misuse of the connection, and denial of service attacks.

The embodiments described herein also can be used for other security benefits that are outside the scope of the UE to Network radio interface. The parameters configured in the embodiments of the present disclosure can observe device and application characteristics such as data transmission frequency, data volume, and device location (geo-fencing), data source and destination address. If, for example, the device had been stolen and moved to another location and then is used to carry other data, the embodiments of the present disclosure could detect these changes in the device data transmission behavior and/or device location.

The present disclosure therefore provides for the configuring, at a given network node, a set of characteristics and ranges of values for each of these characteristics. The present disclosure further provides for the monitoring of the user plane traffic to observe the set of characteristics to identify any anomalous behavior when one or more of the characteristics is out of the configured range. The present disclosure further provides for the invoking of appropriate actions upon observing anomalous behavior.

Figure 3:
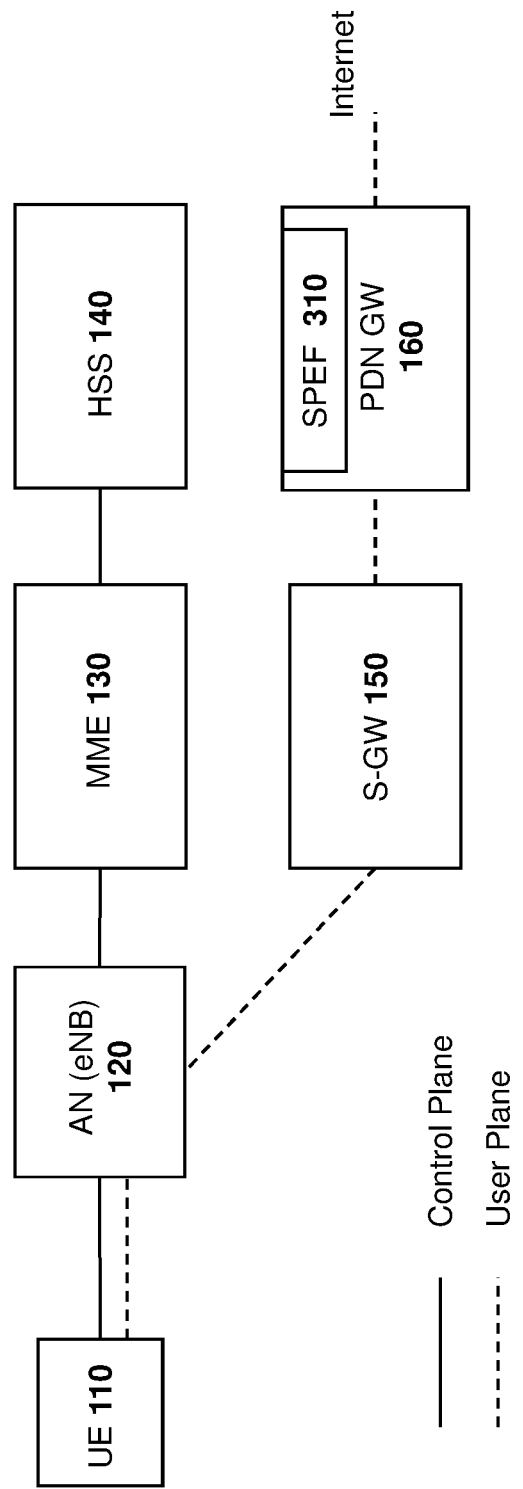
FIG. 3 is a block diagram showing an example evolved packet core network architecture having a security policy enforcement function added to the packet data network gateway.

Reference is now made to FIG. 3. The embodiment of FIG. 3 shows an example fourth-generation network configuration similar to that of FIG. 1. Like numerals to those of FIG. 1 are used in the embodiment of FIG. 3.

In the embodiment of FIG. 3, however, the P-GW 160 is chosen as a network node responsible for identifying any anomalous behavior. In this regard, a security policy enforcement function (SPEF) 310 is added to P-GW 160. A set of characteristics and a range of values for each of these characteristics are configured at the SPEF 310 of P-GW 160.

The embodiment of FIG. 3 is, however, merely one example and the SPEF 310 could be implemented on different network nodes. Further, in some embodiments, different functionality within the SPEF could be implemented on different network nodes. Therefore, the use of the SPEF 310 on the P-GW 160 is merely provided as an example.

Figure 4:
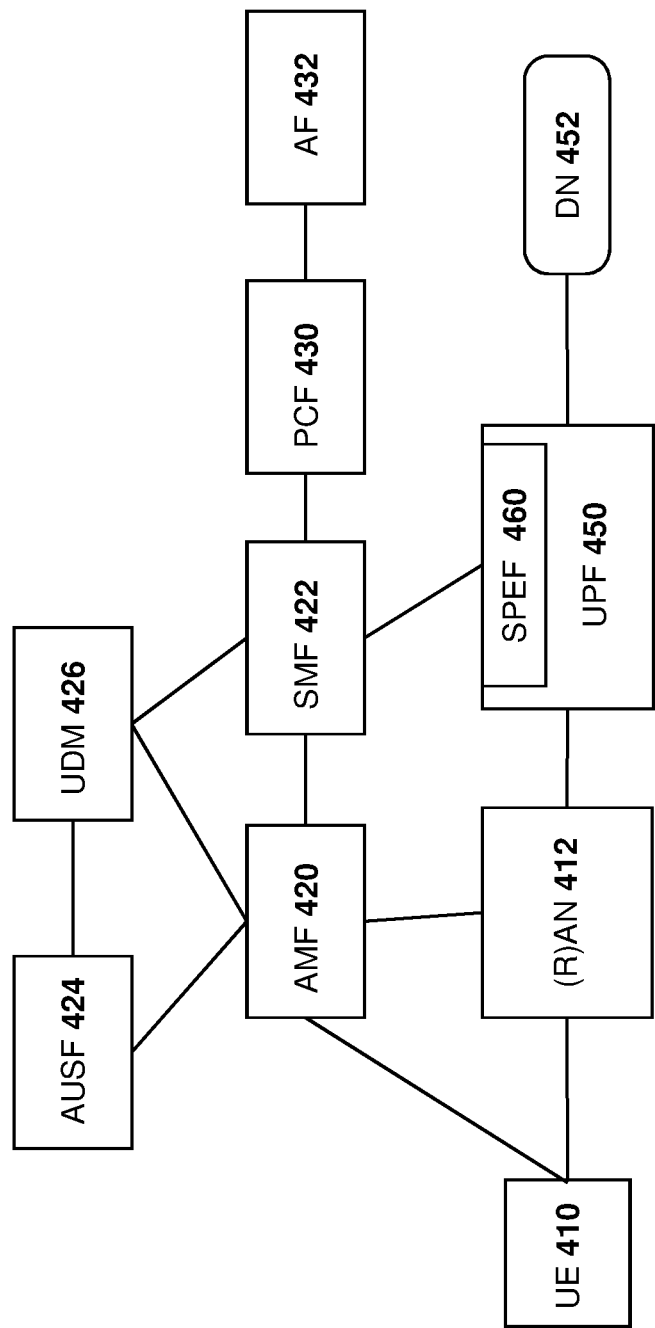
FIG. 4 is a block diagram showing an example fifth generation network architecture having a security policy enforcement function added to the user plane function.

Reference is now made to FIG. 4, which shows an example of a 5G network. In particular, in the embodiment of FIG. 4, a UE 410 communicates with a (Radio) Access Network ((R)AN) 420. (R)AN 420 may further be referred to as a next generation Node B (gNB).

UE 410 may further communicate with an access and mobility management function (AMF) 420.

AMF 420 communicates with the authentication server function (AUSF) 422 and further with a Unified Data Management (UDM) module 424.

Further, AMF 420 also communicates with the session management function (SMF) 426.

A policy control function (PCF) 430 is responsible for policy control and communicates with SMF 426 and with the application function (AF) 432.

(R)AN 412 further communicates with AMF 420 and with a user plane function (UPF) 450. UPF 450 is similar to the P-GW 160 from the embodiments of FIGS. 1 and 3.

UPF 450 communicates with the data network 452, which may be network operator services, the Internet, third-party services, among other options.

In accordance with the embodiment of FIG. 4, SPEF 460 is added to the UPF 450. In this way, the SPEF 460 may identify any anomalous behavior by monitoring user plane traffic.

As indicated above, the embodiments of the present disclosure provide for three aspects. In a first aspect, the SPEF is configured. In a second aspect, the SPEF monitors user plane traffic to observe the set of characteristics and identify any anomalous behavior. In a third aspect, the detected anomalous behavior is acted on by invoking appropriate actions at a network element. Each are described below.

Configuration

In accordance with one embodiment of the present disclosure, an SPEF may be configured with a set of characteristics for communications between a user equipment and a network. Such characteristics are primarily related to the data communication in the user plane. The characteristics are known beforehand and/or can be set beforehand and therefore a session may be monitored by network infrastructure against observed behavior of transmissions.

Where deviation from the predefined characteristics is identified, this would indicate a possible security issue.

One set of characteristics is provided below in Table 3.

TABLE 3

Security Policy Enforcement Function parameters

| Name | Example Range values | Description |
|---|---|---|
| SPE_LOC | GPS coordinates within which the UE shall be located List of valid Cell IDs or tracking area IDs of the UE | UE LOCation: GPS co-ordinates including location/movement/speed behaviour or other information regarding the physical location of the UE (cell-id). These may be known apriori for many UEs such as stationary UEs (e.g. smart meters). |
| SPE_VOLUME | Maximum amount of data in a given period of time Max bytes per second Max data volume in a day/month etc | Estimated data payload volume. This may be specified in the subscription parameters (e.g. available in the HSS) |
| SPE_TOD | Expected time of arrival (some examples below) from 01:00 till 02:00 am every day weekdays only weekends only | Expected Time of Day/Day of Week/Day of Month etc., for connection set up |
| SPE_CONNS | maximum number of TCP/IP connections or maximum number of PDU data sessions per UE | Expected number of simultaneous data connections (TCP/IP) from the UE |
| SPE_DUR | maximum expected duration of a session (e.g. below) max duration 20 mins | Expected duration of connection |
| SPE_FREQ | maximum number of data packets sent in a given duration of time (examples below) Number of IP packets in an hour | Estimated Frequency of data transmission (once per hour/minute/second, or continuous) |

TABLE 3-continued

Security Policy Enforcement Function parameters

| Name | Example Range values | Description |
|---|---|---|
| | Number of IP packets per day/week | |
| SPE_DATATYPE | Allowed data types Image data Video data VoiP type ftp etc Note that this may be identified based on the DSCP field in the IP header Alternatively, this may be also identified based on the payload type of the IP packet (e.g. TCP type payload or UDP etc). Further application level identification is also feasible if the node is capable of performing deep packet inspection. | Type of data; text, numeric, video stream, audio stream, graphics (.jpg, .gif, .pdf), encrypted payload (where the encryption is done at a layer above the radio layer i.e. application layer) |
| SPE_IPADDR | allowed source and/or destination IP address/port numbers | Normal destination address (IP address, URI, or domain name or sub-domain) |
| SPE_BYTES | maximum number of bytes | Exchange of byte counts transmitted and received between the UE and Network over a specific connection. See Prior Art section below. |
| SPE_CAPABILITY | This similar to the SPE_DATATYPE mentioned above. | Permitted subscription usage. For example, data only (no SMS, multi-media, voice (VoIP) traffic allowed). |

In Table 3 above, SPE refers to Security Policy Enforcement. The names of the security policy enforcement specified in Table 3 are however merely examples. Other enforcement characteristics could be defined at the SPEF.

In the Table 3 above, a location characteristic could be set which may include location, movement or speed behavior, or other information regarding the physical location of the UE. The Cell ID or Global Navigation Satellite System (GNSS) coordinates can be used to verify the location of the UE and crosscheck its position with a network value contained in the user profile for the UE to ensure the UE is in the location it should be, or in the region of its expected operation. A device found to be operating outside of its expected location could be flagged as a possible stolen device.

Further, volume information may be set estimating the payload data volume that would be sent from a UE or to a UE.

Time of day information may be set including when expected transmissions to or from the UE may occur.

A number of expected simultaneous connections can also be set. The expected duration of such connections may be a further characteristic that could be monitored.

Further, in some embodiments the estimated frequency of data transmission may be known. Thus, for example, if a weather beacon was expected to transmit every 30 minutes, such frequency could be set with this characteristic.

A datatype for the type of data that would be sent from the UE could also be known or set as a characteristic of the data that is expected from that UE.

Beacons may have a particular destination that they report to. For example, utilizing the weather beacon example, the weather beacon may send data to a particular server and to no other location. In this case, a characteristic could be the normal destination address for the communications.

A further characteristic that may be set may be the number of bytes that are expected to be transmitted in communications. For example, again using the weather beacon system, the UE may send a data packet that has a relatively known size and therefore upper limits on the size of the transmission could be set as a characteristic.

Further, capabilities for the UE could be set, indicating for example that the UE will send data and not SMS, multimedia packets, voice packets among others.

Many of the above parameters are related to traffic flow. Further, if packet payload inspection is used, many of the above parameters may be used with payload contents.

As described below, the above characteristics and ranges can be used by the network to compare the observed traffic against the parameters provided. If the observed traffic falls within the perimeter ranges provided, the network can have confidence of the traffic is valid.

A change in traffic flow can be viewed as a possible threat to the network. For example, changes to traffic with regard to frequency or volume may be associated with a denial of service attack, traffic changes to connection duration, data type, location, time of day, capability, source or destination IP address, byte counts, among others could indicate tampering. As described below, the network can then take appropriate action.

Further, in some embodiments, a device found operating outside of its expected parameters could simply be a malfunctioning device. Operators can then take measures to protect the network from a badly behaving or corrupted device and device owners may be notified of the problem.

The characteristics and ranges of Table 3 above may be preconfigured in the node that holds the subscription information. For example, in 3GPP network architecture, the functionality may reside in the PCF in 5G networks or the HSS in 4G networks.

Alternatively, the information with regard to the characteristics may be obtained directly from a UE for each session. In one embodiment, information from the UE regarding the characteristics may be provided only in integrity protected messages to ensure the validity of the parameters.

For example, during an ATTACH procedure, a UE is authenticated and can possibly securely send expected characteristics of the session in an integrity protected message. Since only an authenticated UE can send an integrity protected message, the parameter values included in the message can be trusted by the network. Based on the information, the set of characteristics and a range of values corresponding to the characteristics may be determined. These values may then, for example, be configured in the SPEF of the P-GW for 4G networks and in the UPF for 5G networks.

Figure 5:
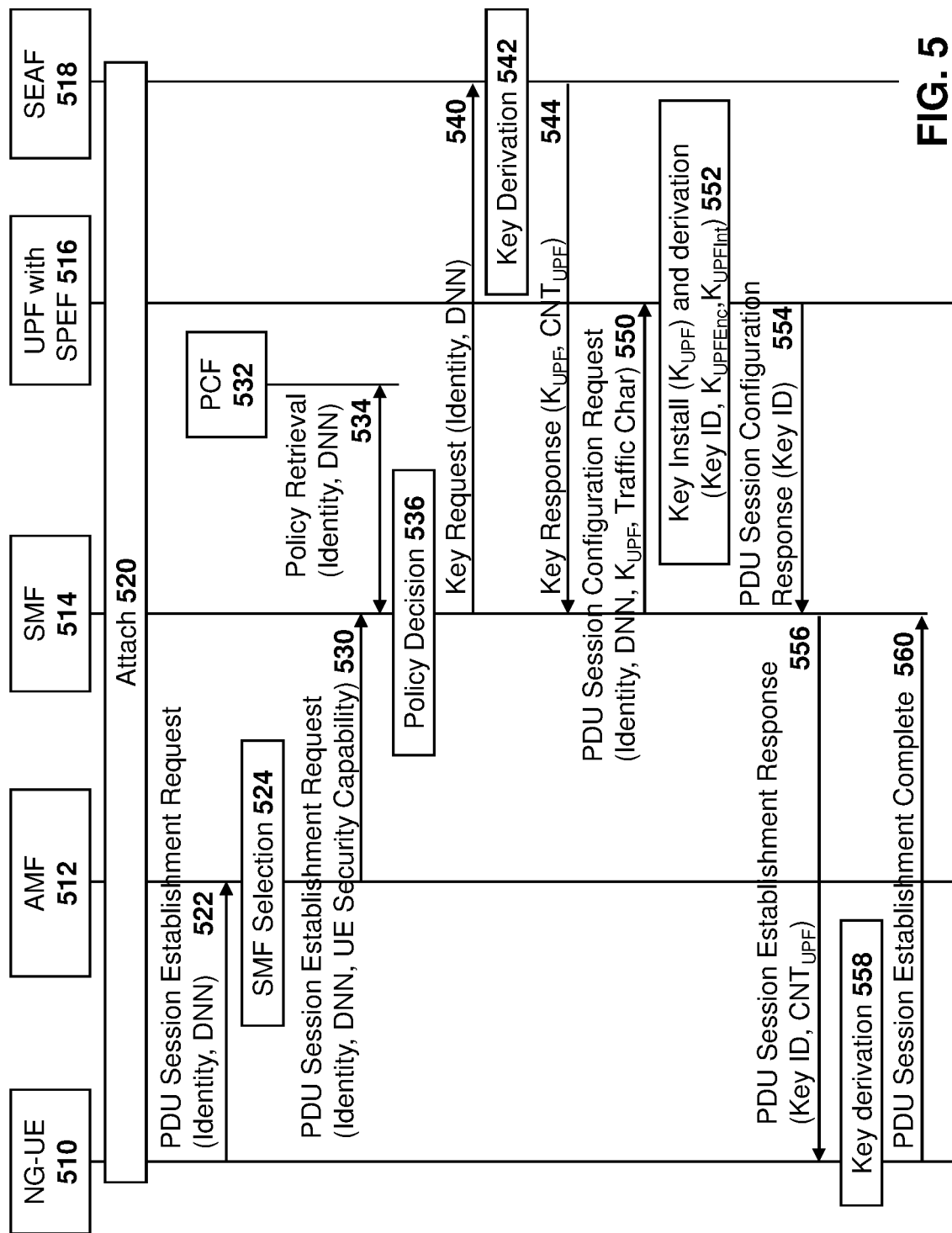
FIG. 5 is a dataflow diagram showing configuration of characteristics and parameters at the user plane function.

For example, reference is now made to FIG. 5, which shows the configuration of characteristics at the UPF in a 5G network.

In particular, in the embodiment of FIG. 5, a next-generation UE (NG-UE) 510 communicates with a 5G network, including AMF 512, SMF 514, UPF with SPEF 516 and Security Enforcement Access Framework (SEAF) 518.

As seen in block 520, the UE is attached with the network. This step involves mutual authentication of the network and the UE.

Optionally, in block 520, the UE may provide the expected characteristics of the session in a secure and integrity protected message. An example of such integrity protected message is a PDU session establishment request message 522 from the UE.

Message 522 may include an identity as well as a data network name (DNN). In one embodiment, the UE security capability, including user plane security capabilities, is stored in the AMF during the ATTACH. Alternatively, the NG-UE 510 may provide its user plane security capabilities in message 522.

Subsequently, at block 524, the AMF determines an SMF based on the DNN provided by NG-UE 510.

The AMF 512, once it has chosen an appropriate SMF, triggers the session establishment procedure by sending a PDU session establishment request to the SMF, shown by message 530. Message 530 includes the UE identity, DNN and security capability.

SMF 514 may then retrieve a security policy from PCF 532, as shown by arrow 534. In one embodiment, the security policy may include a set of characteristics and the range of values for each characteristic, as shown in the first two columns of Table 3 above.

Alternatively, the SMF 514 may determine the characteristics and ranges based on a policy retrieved from the PCF. In other embodiments, some or all of the values may also be attained directly from the UE during the ATTACH or PDU session establishment request 522. In this case, the values are passed to the SMF 514 from AMF 512.

At block 536, the SMF may check whether the NG-UE 510 is authorized to establish the requested PDU session and it determines the user plane security termination.

If the NG-UE 510 is authorized to establish the PDU session and UPF security termination is required for the PDU session, the SMF 512 may request a key for the UPF. The SMF 514 provides the SEAF 518 with the UE identity, DNN and SMF identity in message 540.

The SEAF derives a UPF Key ($K_{UPF}$) from the $K_{SEAF}$ by incorporating the parameters received from the SMF 514 and a locally managed counter (for example $CNT_{UPF}$) for UPF Key derivation. The key derivation is shown at block 542.

The SEAF 518 then sends a key response message 544 to the SMF 514. The key response includes the $K_{UPF}$ and $CNT_{UPF}$ used for the key derivation. Thus, the counter at block 542 is sent back.

On receiving message 544, SMF 514 sends a PDU session configuration request to the UPF containing the security configuration information for the PDU session. This may include, for example, the ciphering and/or integrity protection algorithm, including the $K_{UPF}$ and traffic characteristics for the PDU session. This is sent in message 550 in the embodiment of FIG. 5.

The UPF with the SPEF 516 installs the $K_{UPF}$ for the session as part of the PDU session configuration and derives subsequent keys such as $K_{UPFEnc}$ and $K_{UPFInt}$. Such keys are derived based on security configuration information. The keys are associated with a key ID, which may also be incorporated in the key derivation. However, if integrity and confidentiality protection are not applied to the PDU session and the $K_{UPF}$ is null, there may be no derivation of the subsequent keys. Further, the UPF configures the security policy enforcement function with the traffic characteristic parameters received from the PCF from this PDU session. The key install is shown at block 552 in the embodiment of FIG. 5.

The UPF then sends a PDU session configuration response 554 to the SMF 514 containing a PDU session ID, key ID and other parameters if they exist, used for the key derivation.

The SMF 514 then sends a PDU session establishment response to the NG-UE 510 via the AMF 512, shown by message 556. This response message includes all key materials such as $CNT_{UPF}$, key ID, among others, that are needed for the NG-UE 510 to derive the same keys as the UPF.

NG-UE 510 derives $K_{UPF}$ and subsequent keys based on the session establishment response at block 558.

The NG-UE 510 then sends a PDU session establishment complete message 560 to the SMF 514 via AMF 512.

After the completion of sending the message 560, NG-UE 510 and the UPF protect the user plane the packets based on the PDU session security configuration terminating at the UPF, which includes the SPEF.

Changes to 3GPP TR 33.899 which may accommodate the above are shown, for example, in Appendix C below. The additions to the TR are shown in bold.

Similarly, the characteristics could be provided to the P-GW with a SPEF in a 4G network. For example, reference is now made to FIG. 6.

Figure 6:
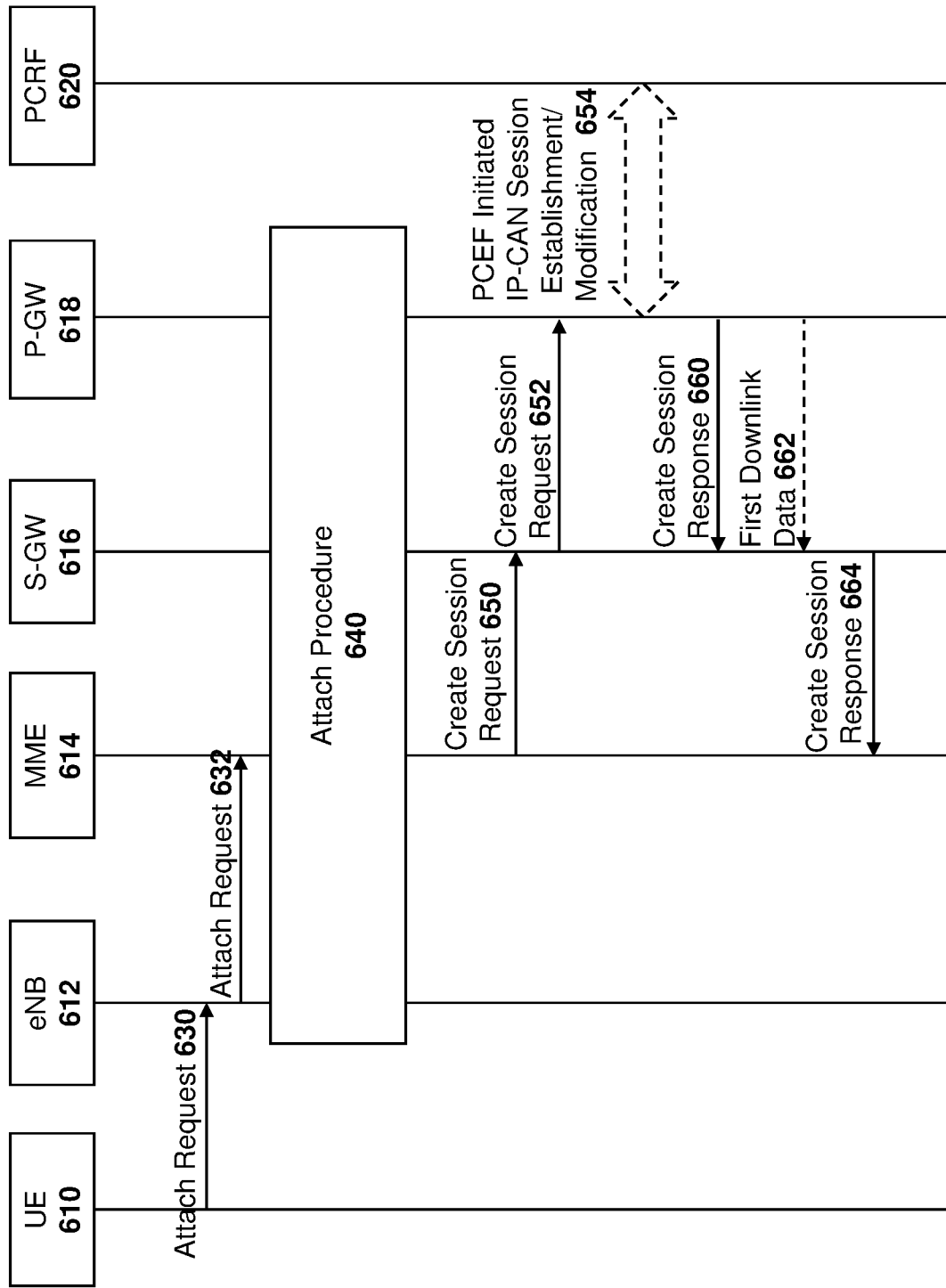
FIG. 6 is a dataflow diagram showing an example ATTACH procedure.

In the embodiment of FIG. 6, a UE 610 communicates with eNB 612. Further, network elements include MME 614, S-GW 616, P-GW 618 and Policy and Charging Rules Function (PCRF) 620.

At the outset, UE 610 makes an ATTACH request to eNB 612, as shown by message 630.

The eNB 612 forwards the ATTACH request to MME 614, as shown by message 632.

Thereafter, an ATTACH procedure, as for example defined in 3GPP TS 23.401, and namely steps 1-11 in Section 5.3.2.1 is performed, as shown by block 640 in the embodiment of FIG. 6.

If the subscription context does not indicate that the APN is for a PDN connection, MME 614 selects a serving gateway 616. It then sends a Create Session Request 650. Such Create Session Request may include various session request information, including security policy enforcement parameters.

Once serving gateway 616 receives request 650, it may then send a Create Session Request with standard information, as well as security policy enforcement parameters, to P-GW 618, shown as request 652.

The P-GW 618 may then perform an IP-CAN session establishment procedure with PCRF 620, as for example defined in 3GPP TS 23.203, and thereby obtains default Policy and Charging Control (PCC) rules for the UE. This is shown with arrow 654 in the embodiment of FIG. 6.

The P-GW 618 creates a new entry in its EPS bearer context table and generates a Charging ID for the default bearer. The new entry allows the P-GW 618 to route user plane PDUs between the S-GW 616 and the packet data network. If the SPEF parameters are present, the SPEF function will be invoked in the P-GW 618 and will commence monitoring the user plane PDUs for the UE 610.

The P-GW 618 will return to S-GW 616 a Create Session Response, shown as response 660.

If the ATTACH is not based on a handover then first downlink data, shown by arrow 662 may be received. At this point, S-GW 616 may send a Create Session Response to MME 614, as shown by message 664.

Monitoring of User Plane Traffic

Upon being configured with a set of characteristics and their valid ranges, as for example described with regard to FIGS. 5 and 6 above, the SPEF may start monitoring the mobile originated and mobile terminated traffic. If one or more characteristics of the user plane data are beyond the configured range, the SPEF may detect an anomaly, which may indicate a possible security vulnerability and may trigger an appropriate action based on the cause of the identified anomaly.

The monitoring may be for particular characteristics. In one embodiment, monitoring can occur by having each of the characteristics configured at the SPEF monitored separately. In other embodiments, the monitoring can occur for a plurality of characteristics.

Examples of monitoring are shown below with regard to the embodiments of FIGS. 7, 8 and 9. However, the embodiments in these figure are merely provided for illustration, and other examples of monitoring for particular characteristics would be apparent to those skilled in the art having regard to the present disclosure.

Figure 7:
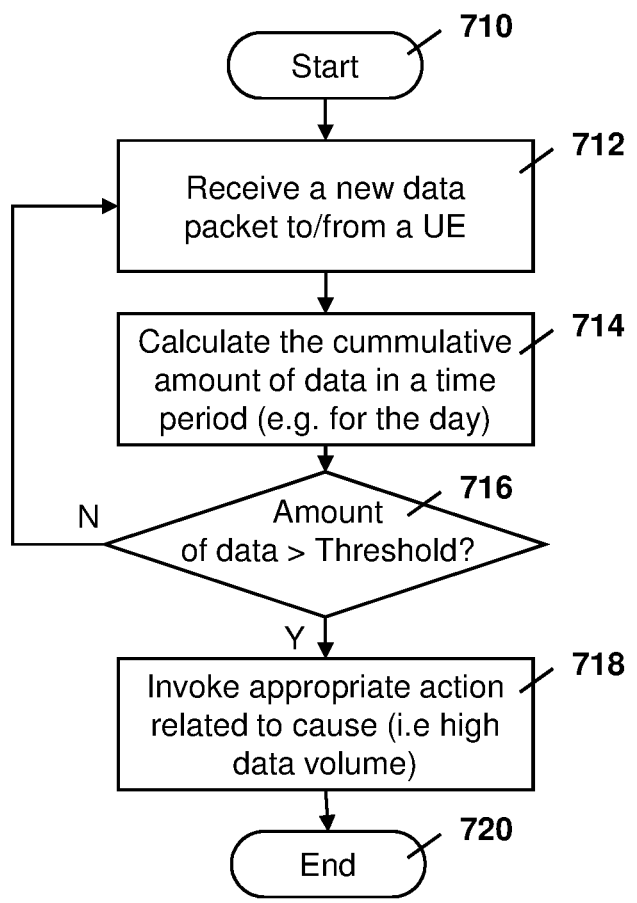
FIG. 7 is a process diagram showing a process for monitoring packet data to determine whether a cumulative amount of data over a time period exceeds a parameter threshold.

Referring to FIG. 7, the embodiment shows a process at the SPEF for monitoring for data volume. In particular, the process of FIG. 7 starts at block 710 and proceeds to block 712 in which new data packets that are destined for a UE or are from a UE are received.

The process then proceeds to block 714 in which a calculation is done on the cumulative amount of data that has been received by a UE or is sent to the UE for a particular time period. For example, if the configuration for a UE has been set with a characteristic that expects a certain amount of data for the UE for each given day, the calculation at block 714 may calculate the cumulative data for that time period. In other embodiments, the time period may be one hour, a number of minutes, one week, one month, among other time periods.

The process then proceeds to block 716 in which a check is made to determine whether the amount of data received in the time period exceeds a threshold for the expected amount of data from the UE or to the UE. For example, if the UE is expected to send less than 1 MB of data per day and the cumulative amount of data sent from the UE has exceeded the 1 MB, then the check at block 716 is affirmative and the process proceeds to block 718.

At block 718, if the amount of data has exceeded the threshold, then an appropriate action is invoked related to the cause of high volume data. Example actions are described below.

Conversely, if the amount of data is less than the threshold, then the process proceeds from block 716 back to block 712 in which the process waits for the next data to be received for or from the UE.

From block 718 the process proceeds to block 720 and ends.

Thus, in accordance with the embodiment of FIG. 7, a network element may monitor data traffic to or from a UE to ensure that the amount of data does not exceed a threshold for a time period.

Figure 8:
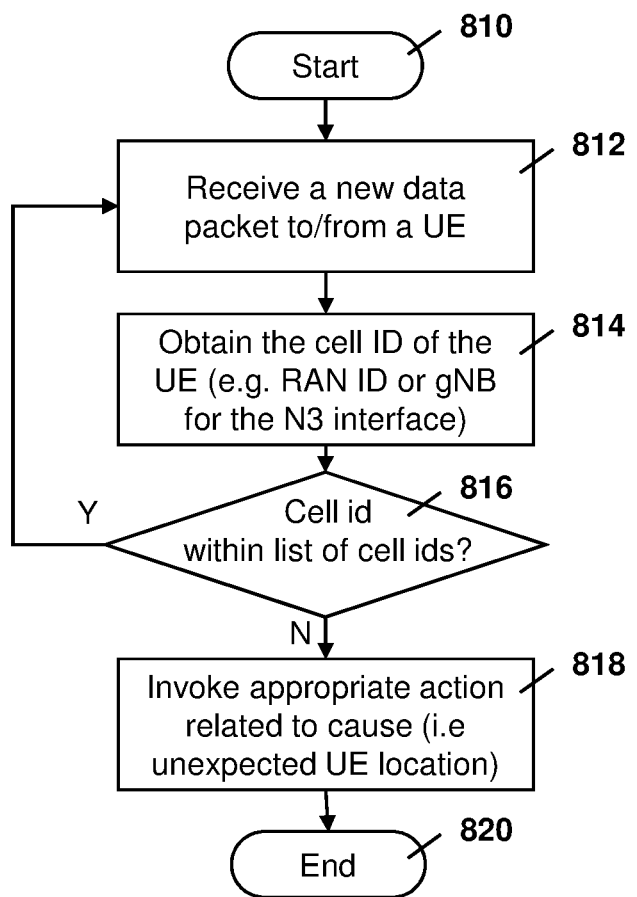
FIG. 8 is a process diagram showing a process for monitoring packet data to determine a location of a user equipment.

Reference is now made to FIG. 8, which shows a process for monitoring location of a UE at the SPEF. In particular, the process starts at block 810 and proceeds to block 812 in which a new data packet has been received that is destined for a UE or a new data packet has been received from a UE.

The process then proceeds to block 814 in which the location of the UE is determined. For example, in one embodiment the location may be determined based on the cell identifier of the UE. This may, for example, be the Radio Access Network Identifier (RAN ID) or the eNB identifier for the N3 interface in one embodiment. However, location may be determined in a variety of ways and the obtaining of the location of block 814 could use different methods.

From block 814 the process proceeds to block 816 in which the check is made to determine whether the cellular identifier is within a list of cellular identifiers configured as a characteristic for that particular UE. For example, if a UE is meant to be a stationary UE such as a parking meter, then the movement of the UE to a different cell ID may indicate that the UE has been stolen or is being spoofed.

From block 816, if the cell ID is within the list of parameters for the location characteristic, the process proceeds back to block 814 to wait for new packet data to or from the UE.

Conversely, if the cell ID is not within the list of cell ID parameters, as determined at block 816, then the process proceeds to block 818 in which appropriate actions are invoked related to the cause of an unexpected UE location. Examples of actions are described below.

From block 818 the process proceeds to block 820 and ends

Thus, based on FIG. 8, the SPEF may monitor the location of a UE to ensure that the location for the UE is expected.

Figure 9:
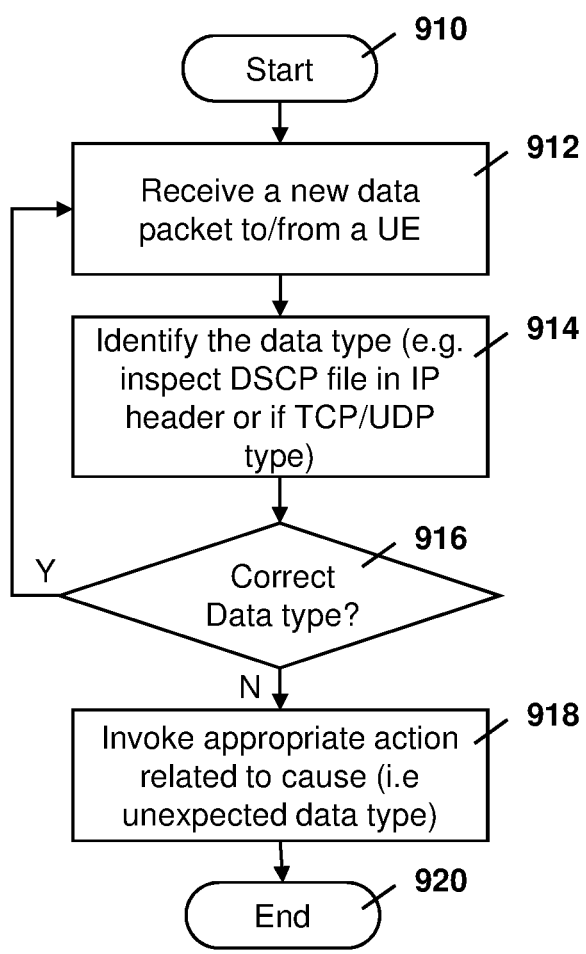
FIG. 9 is a process diagram showing a process for monitoring a packet data type to ensure an expected packet data type is being conveyed by a network.

Reference is now made to FIG. 9, which shows a process at an SPEF for data type monitoring functionality. In particular, the process of FIG. 9 starts at block 910 and proceeds to block 912 in which a new data packet destined for a UE or a new packet from a UE is received.

The process then proceeds to block 914 in which a data type is identified for the data packet. For example, the data type may be identified by inspecting the Differentiated Services Code Point (DSCP) field in the IP header or by identifying whether the packet is a Transmission Control Protocol/User Datagram Protocol (TCP/UDP) type packet.

Other methods for defining the data type are also possible and the present disclosure is not limited to any particular method for identifying the datatype at block 914.

From block 914 the process proceeds to block 916 and checks whether the data type is the correct data type. The check could use parameters associated with data type characteristics that have been configured for the UE. Such parameters allow the SPEF to determine whether the UE is allowed to send the packet with the datatype identified at block 914.

If the datatype is the correct datatype, the process proceeds to block 912 in which the process waits for the next data packet to or from the UE.

Conversely, if the datatype at block 916 is identified to be an incorrect datatype, then the process proceeds to block 918 in which an appropriate action related to a cause is invoked, where the cause is set to unexpected datatype. For example, in the parking meter example, the parking meter may be expected to send TCP packets. However, if a Short Message Service (SMS) message is received then this could be identified as an incorrect datatype and an action invoked at block 918 made be reflective of this. Actions are described below.

The process proceeds to block 920 and ends.

Thus the embodiment of FIG. 9 shows an example process for monitoring datatypes for traffic originating from a UE or traffic destined to a UE.

The examples of FIGS. 7, 8 and 9 are provided for illustration. Similar processes could be used for the different characteristics configured at the SPEF for the UE to determine whether or not the user plane traffic is within parameters specified for such characteristics Triggering Appropriate Actions Upon detecting one or more anomalies in user plane traffic, the SPEF may trigger an appropriate action specific to the detected set of anomalies. Some actions may include simple user plane functionality such as dropping packets while other actions may include control plane functionality such as triggering specific 3GPP control plane procedures.

Various example actions are provided below. However, the list of actions is merely provided for illustration, and other actions could also be performed. The actions described below are therefore not limiting.

Trigger Alarms Sent to a PLMN Network Management Function

Figure 10:
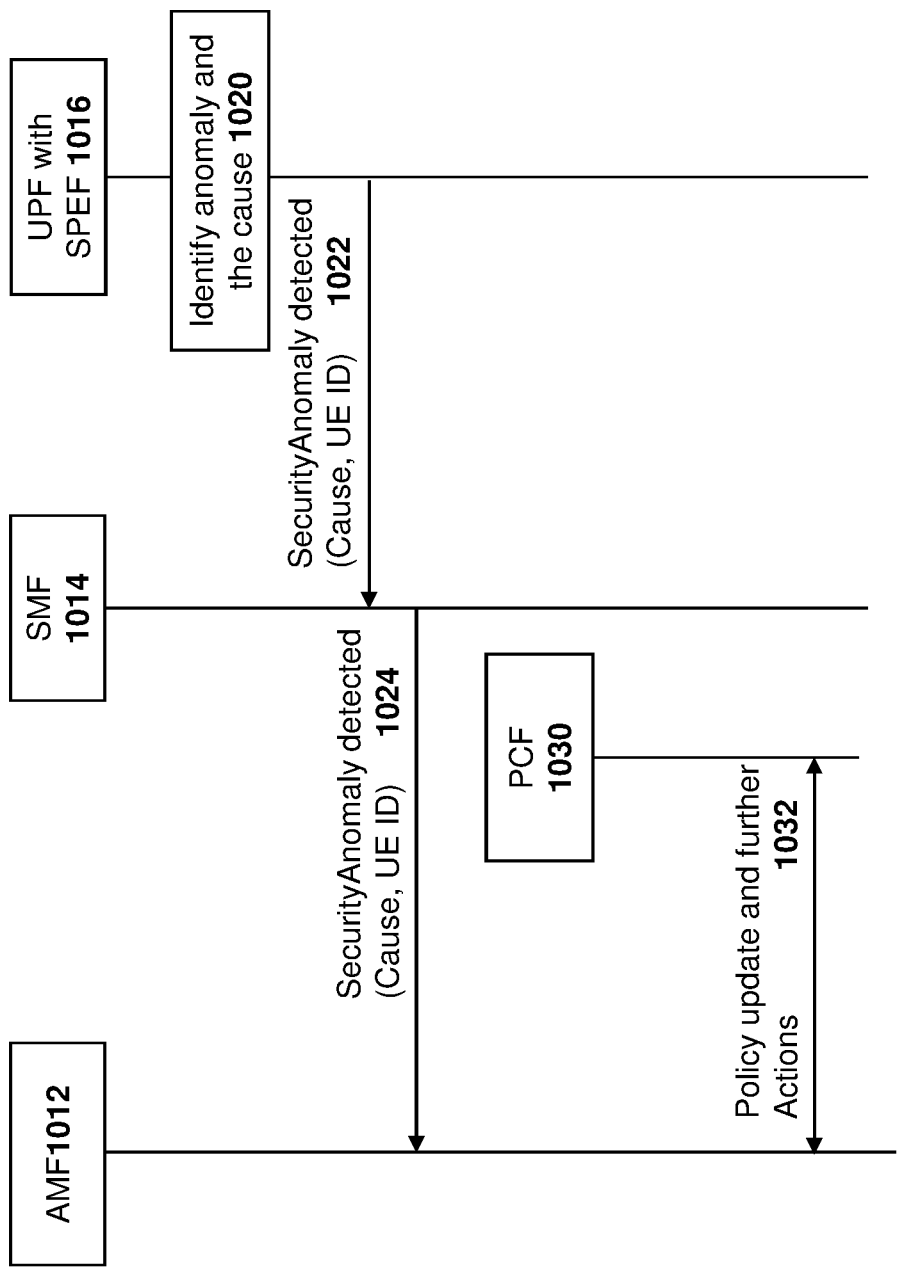
FIG. 10 is a dataflow diagram for updating a policy on detection of an anomaly.

Reference is made to FIG. 10. In a first example of an action, control plane nodes such as the SMF 1014, AMF 1012 and PCF 1030 may be involved in executing the action. In particular, the action in the example of FIG. 10 involves policy updates with the PCF 1030.

In the example of FIG. 10, the UPF with the SPEF 1016 may identify an anomaly and the cause of the anomaly at block 1020. Based on the anomaly and cause, the UPF may then send a message 1022 to the SMF 1014 indicating that a security anomaly has been detected. The message 1022 may include a cause, as well as a user equipment identifier.

SMF 1014 may then forward the contents of message 1022 to AMF 1012, shown as message 1024, with the cause and the user equipment identifier.

Upon receiving the message 1024, AMF 1012 may update the policy record in the PCF 1030, shown with policy update 1032. The updating may trigger further actions such as notifying the user, requiring user plane security, among other actions, as provided below.

Trigger a Notification to the Device Owner

Figure 11:
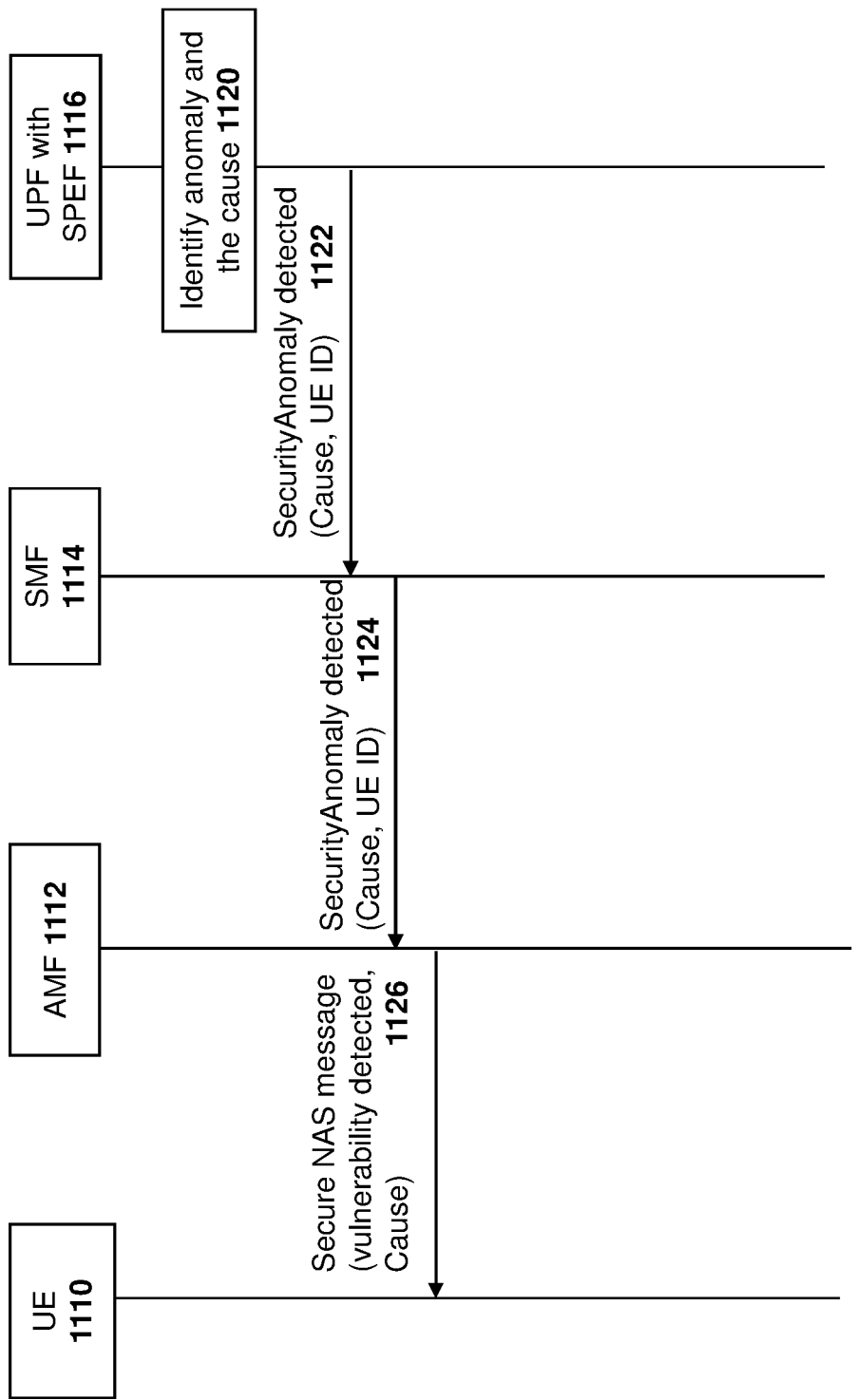
FIG. 11 is a dataflow diagram showing the sending of a secure message to a user equipment indicating that an anomaly has been detected.

Reference is now made to FIG. 11, which shows an action that may be invoked by control plane nodes SMF 1114, AMF 1112 and the UPF with the SPEF 1116. In the example of FIG. 11, the UE 1110 receives a notification.

In the example of FIG. 11, the UPF with the SPEF 1116 identifies an anomaly in a cause, shown at block 1120. The UPF may then send a message 1122 to SMF 1114, indicating that a security anomaly has been detected. Message 1122 may include a cause and a user equipment identifier.

SMF 1114 may then forward the contents of message 1122 to the AMF 1112, shown as message 1124.

AMF 1112 may then forward, to the UE 1110, a message indicating that a vulnerability has been detected and cause of the vulnerability. This is shown as message 1126 in the embodiment of FIG. 11. Message 1126 may be a secure Network Access Stratum (NAS) message in one embodiment. Thus, message 1126 may be encrypted and/or integrity protected to ensure that only the authentic UE is informed about the detected vulnerability, since only the authentic UE will have the keys needed for integrity and decryption.

Drop the Packets to or from the Concerned UE

Figure 12:
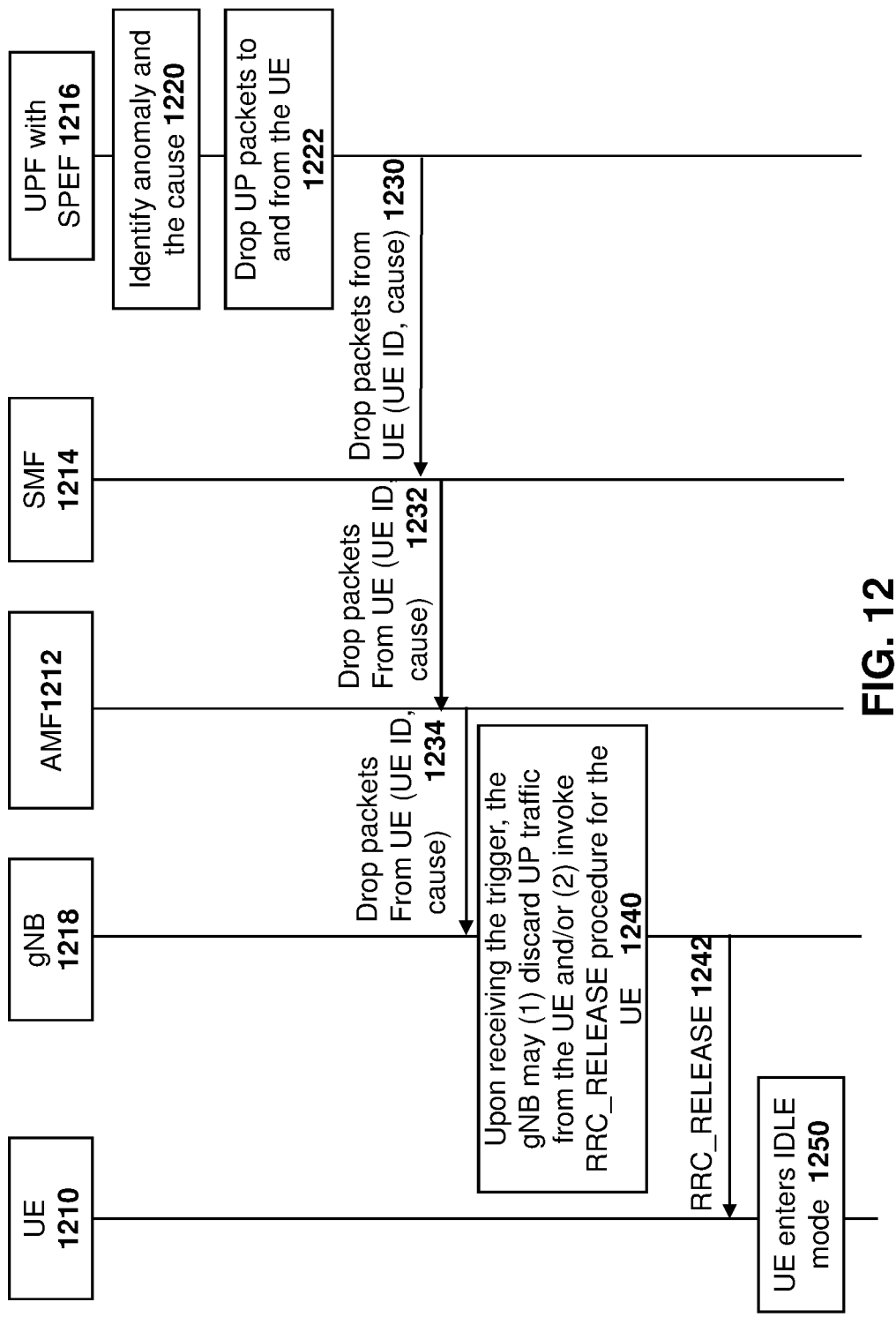
FIG. 12 is a dataflow diagram showing the dropping of user plane packets upon detection of an anomaly and further optionally releasing an RRC Connection with the user equipment.

In another embodiment, only one user plane node such as the UPF may be involved with the action. Reference is now made to FIG. 12 which shows a UPF with the SPEF 1216 being involved with user plane traffic. Further, messages may be forwarded through SMF 1214, AMF 1212, and the gNB 1218. Further, the UE 1210 receives control plane messages.

In the embodiment of FIG. 12, the UPF with the SPEF 1216 identifies an anomaly and a cause at block 1220 and may then drop the packets to and from the UE at block 1222.

In one embodiment, this may be the end of the action.

In other embodiments, the UPF may optionally trigger to the gNB to drop the packets from the UE, which could save the traffic hitting the core network nodes between the RAN node and the UPF. In this case, a control plane node such as the AMF 1212 and the SMF 1214 may need to be involved with such functionality.

In particular, in the embodiment of FIG. 12, the UPF may send a message 1230 to drop packets from the UE, including a user equipment identifier and a cause. Message 1230 may be sent to SMF 1214.

SMF 1214 may then forward the contents of message 1230, shown as message 1232, to AMF 1212.

AMF 1212 may then forward the contents of message 1232, shown as message 1234, to gNB 1218.

On receiving message 1234, the gNB 1218 may discard user plane (UP) traffic from the UE and/or invoke the RRC release procedure for the UE, as shown at block 1240. In the latter case, if an RRC release is invoked then the RRC release is sent to the UE, as shown by arrow 1242 and the UE may then enter an IDLE mode, as shown by block 1250

Trigger an Integrity Check or Counter Check Procedure

In a further action, a procedure may be initiated by a RAN node such as the gNB in 5G networks. However, a trigger to initiate the procedure may come from any core network node.

Figure 13:
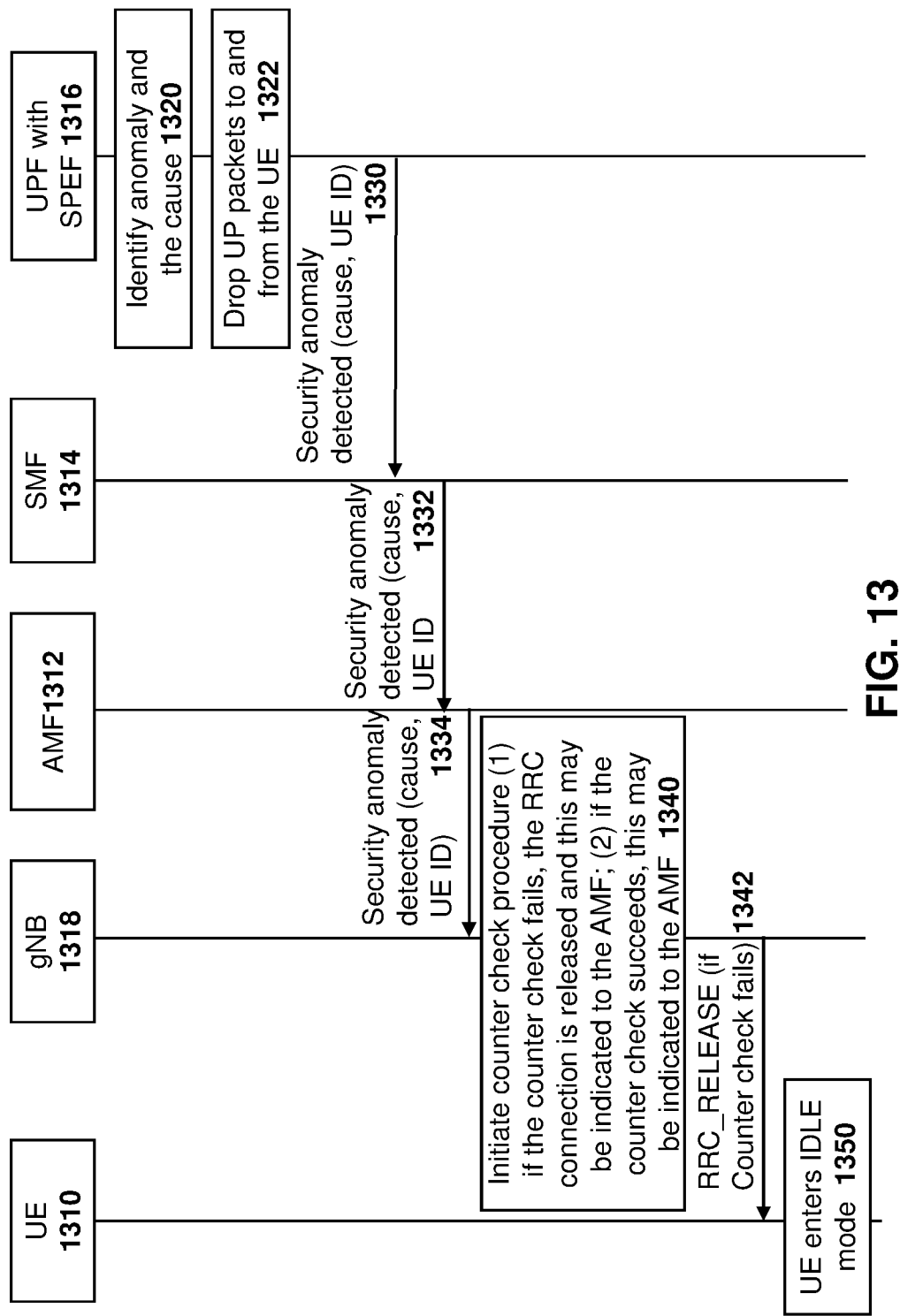
FIG. 13 is a dataflow diagram showing the initiation of a counter check procedure upon detection of an anomaly.

Reference is now made to FIG. 13. In the embodiment of FIG. 13, the SPEF may cause the RAN node to trigger a counter check procedure upon detecting a specific anomaly.

In the embodiment of FIG. 13, UE 1310 may communicate with a RAN node such as gNB 1318. Further, core network node such as AMF 1312 and SMF 1314 may be involved in communication with UPF and SPEF 1316.

The UPF with SPEF 1316 may identify an anomaly and a cause, as shown by block 1320, and may in one embodiment drop the user plane packets to and from the UE as shown by block 1322.

Further, in the embodiment of FIG. 13, the UPF with the SPEF 1316 may signal a security anomaly has been detected, along with a cause and a user equipment identifier, and send this as a message 1330 to the SMF 1314.

The SMF 1314 may forward the contents of message 1330, shown as message 1332, to the AMF 1312.

AMF 1312 may then forward the contents of message 1332 to the gNB 1318, as shown by message 1334.

On receiving message 1334, the gNB 1318 may initiate a counter check procedure. If the counter check fails, the RRC connection may be released and this may be indicated to the AMF 1312 and one embodiment. Further, if the counter check succeeds, the gNB 1318 may indicate the success to the AMF 1312.

The initial counter check procedure is shown by block 1340 in the embodiment of FIG. 13.

Based on the check at block 1340, if the counter check fails, an RRC release may be initiated as shown by arrow 1342 in FIG. 13.

On receiving the RRC release, the UE may enter an idle mode, shown by Block 1350.

Trigger an Authentication Procedure

Figure 14:
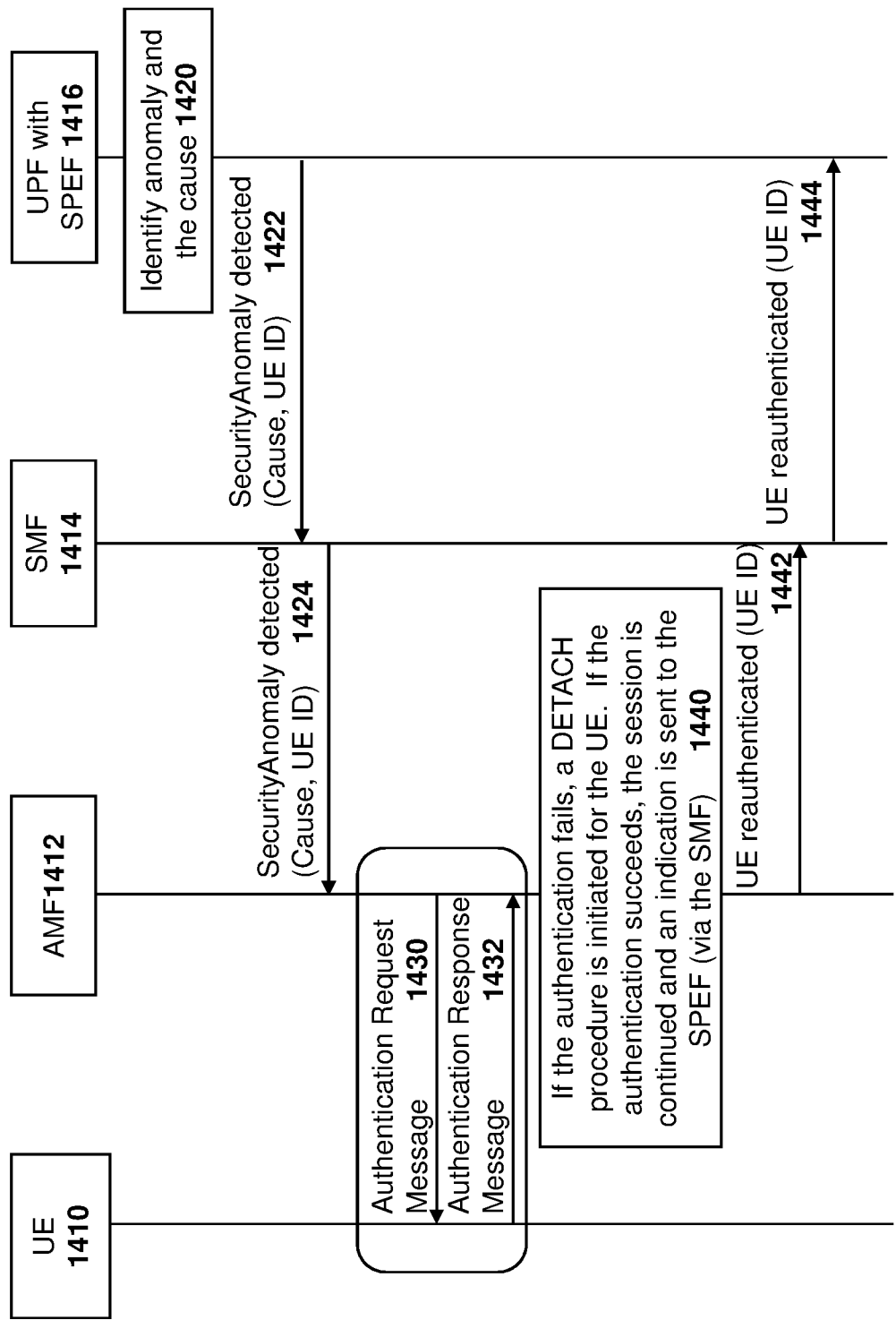
FIG. 14 is a dataflow diagram showing the initiation of an authentication request with a user equipment upon detection of an anomaly.

In still a further action, upon detecting an anomaly, the SPEF may trigger an authentication procedure for the UE. Reference is now made to FIG. 14.

In the embodiment of FIG. 14, an NAS authentication procedure is triggered by the AMF. Specifically, UE 1410 communicates with AMF 1412. Further, the core network includes SMF 1414 and user plane data is monitored by UPF with SPEF 1416.

The UPF with the SPEF 1416 identifies an anomaly and cause, as shown by block 1420, and based on the detected anomaly and cause provides a message 1422 to the SMF 1414 indicating that a security anomaly has been detected. Message 1422 may include a cause and a user equipment identifier.

SMF 1414 then forwards the contents of message 1422 to the AMF 1412, shown as message 1424.

Based on message 1424, AMF 1412 initiates an authentication procedure. In particular, an authentication request message 1430 may be sent to UE 1410.

In response, an authentication response message 1432 may be provided from the UE 1410 back to AMF 1412.

AMF 1412 verifies the response in message 1432 to determine whether authentication has passed or failed. Further, the absence of a response may also indicate authentication has failed. The authentication check is shown at block 1440 in the embodiment of FIG. 14.

If the authentication fails, a DETACH procedure may be initiated for the UE. One example DETACH procedure is described below with regards to FIG. 17.

Conversely, if the authentication succeeds, the session is continued and an indication may be sent to the SPEF via the SMF 1414.

Thus, if the authentication is successful then the UE is re-authenticated as shown by message 1442 between AMF 1412 and SMF 1414. SMF 1414 then forwards the contents of message 1442 to the UPF 1416, shown as message 1444.

Trigger a Connection Re-Establishment Procedure

A further action that may occur would be to trigger a DETACH procedure for the UE upon detecting an anomaly. In this case, a genuine UE may perform a new ATTACH procedure, including authentication, subsequent to the DETACH procedure.

Figure 15:
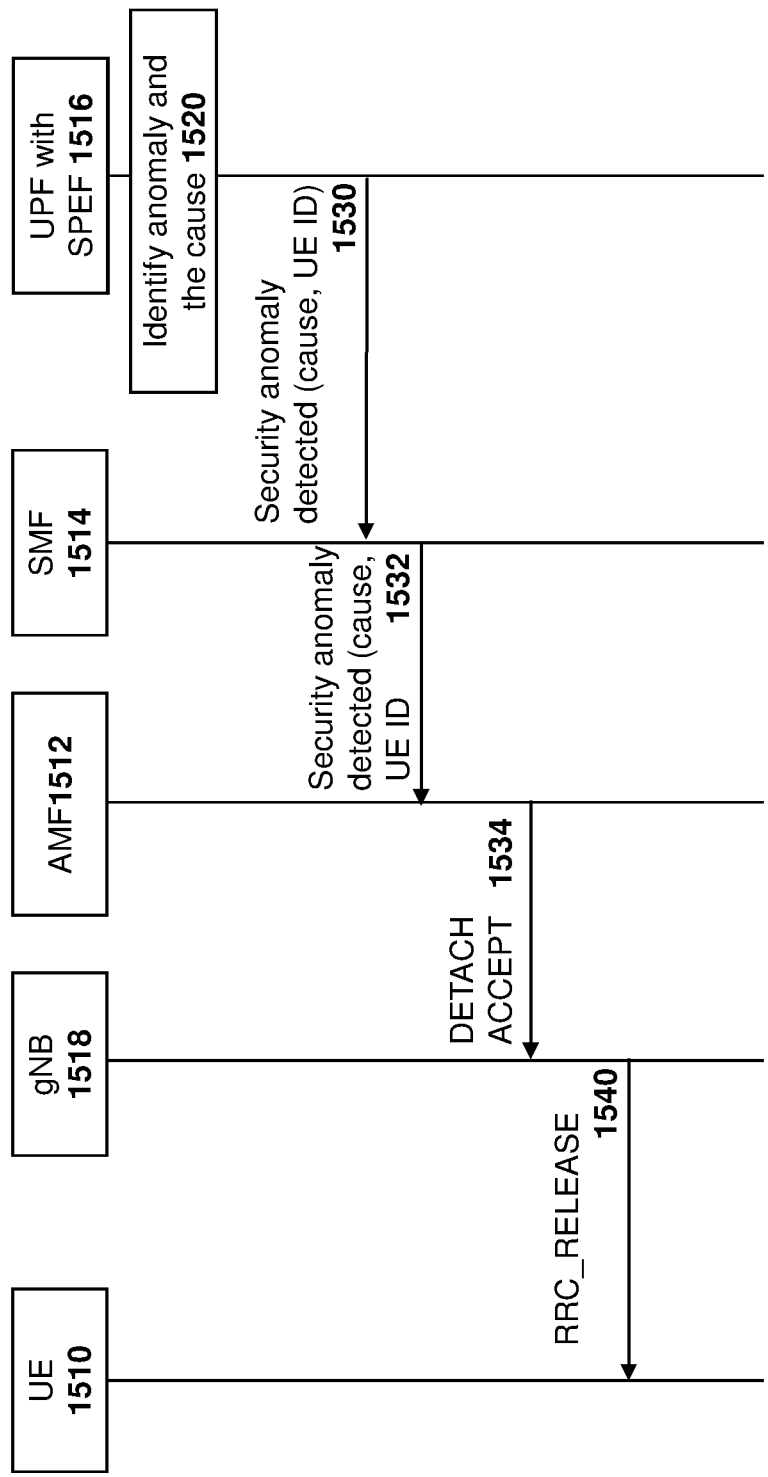
FIG. 15 is a dataflow diagram showing a DETACH procedure upon detection of an anomaly.

Reference is now made to FIG. 15. In particular, in the embodiment of FIG. 15, UE 1510 communicates with the network using gNB 1518. The core network includes AMF 1512 and SMF 1514. Further, UPF with SPEF 1516 provides for user plane traffic.

The UPF with the SPEF 1516 identifies an anomaly and a cause at block 1520. The UPF with the SPEF 1516 then signals a security anomaly has been detected, including the cause and a user equipment identifier, in message 1530 to the SMF 1514.

SMF 1514 may then forward the contents of message 1530 to AMF 1512, shown as message 1532.

AMF 1512 may then send a DETACH ACCEPT message 1534 to the gNB 1518, which may cause an RRC release 1540 with the UE 1510.

As indicated above, a genuine UE 1510 could then perform an ATTACH procedure with the authentication security.

One example DETACH procedure is shown with regards to FIG. 17 below.

Switch on Encryption and/or Integrity Protection

Figure 16:
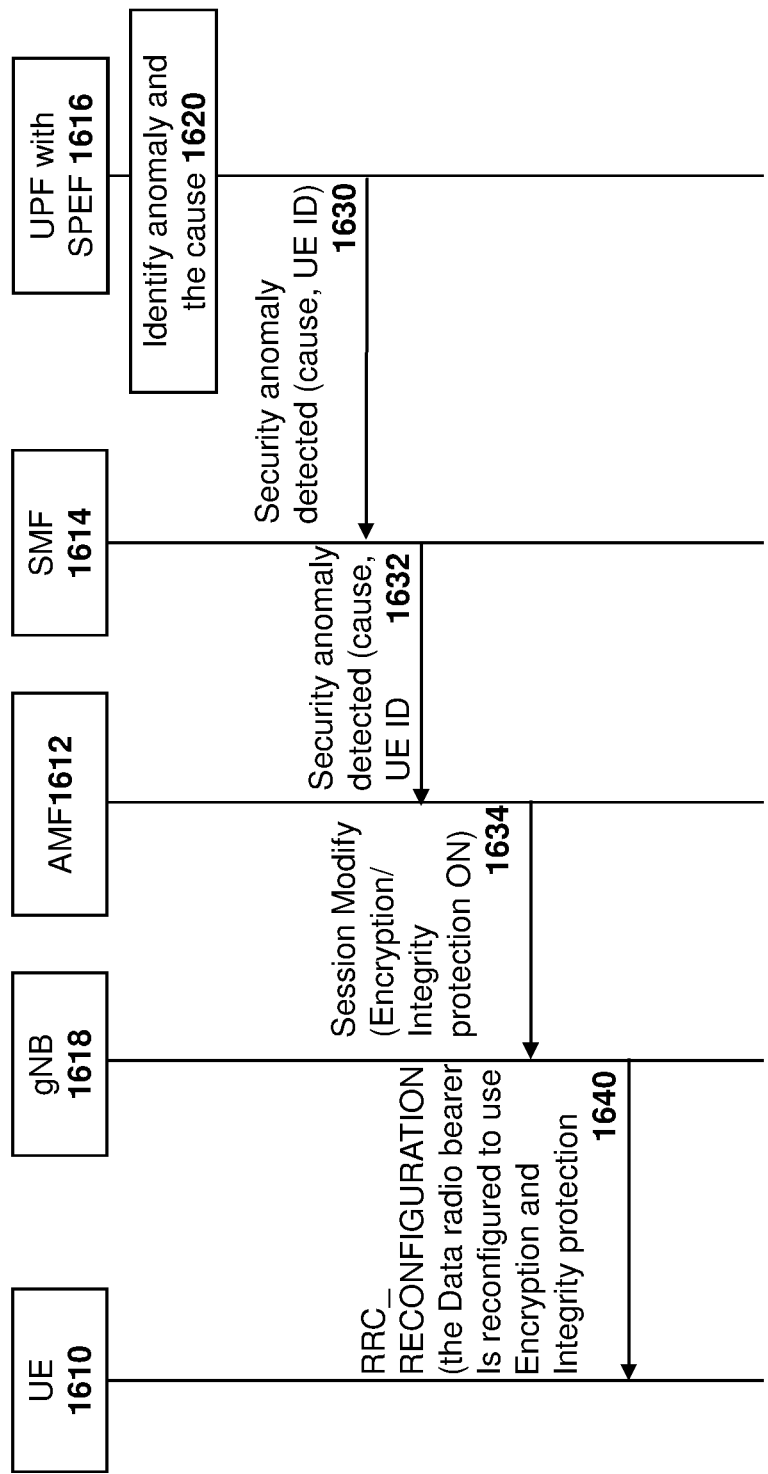
FIG. 16 is a dataflow diagram showing RRC RECONFIGURATION of a user equipment to turn on encryption and/or integrity detection upon detection of an anomaly.

In a further action, the SPEF may trigger the radio node to switch on the encryption and/or integrity protection of data. Such trigger may be a temporary trigger in some embodiments. Reference is now made to FIG. 16.

UE 1610 communicates using gNB 1618. Further, the core network includes AMF 1612 and SMF 1614. A UPF with SPEF 1616 provides for user plane traffic.

In the embodiment of FIG. 16, the UPF with the SPEF 1616 identifies an anomaly and a cause at block 1620 and provides a message 1630 to SMF 1614 indicating that a security anomaly has been detected. Message 1630 may include a cause and a user equipment identifier.

SMF 1614 may then forward the contents of message 1630 to AMF 1612, shown as message 1632.

AMF 1612 may then trigger a session modification to turn on encryption or integrity protection, as shown by message 1634, with gNB 1618.

Based on the receipt of message 1634, gNB 1618 may then cause an RRC-reconfiguration. The RRC reconfiguration 1640 may include the data radio bearer being reconfigured to use encryption and/or integrity protection.

Once UE 1610 receives the RRC reconfiguration 1640, only a genuine UE can succeed in switching encryption and/or integrity protection on, since this requires the UE to be in possession of the appropriate security keys.

DETACH

In the actions shown with regard to FIGS. 14 and 15 above, the UE is caused to DETACH. This may be accomplished in various ways.

Figure 17:
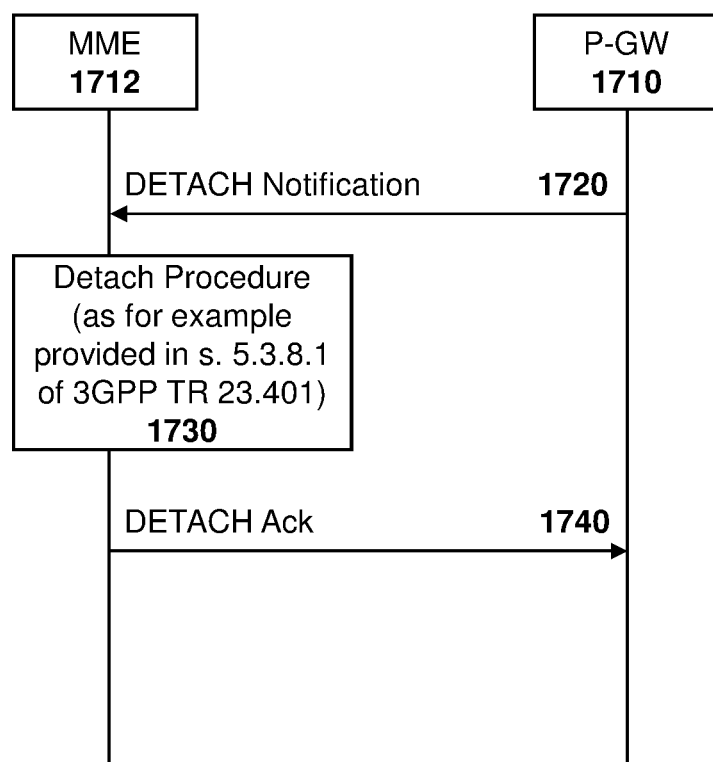
FIG. 17 is a dataflow diagram showing an example DETACH procedure.

One example of a detach for a 4G network is provided with regard to FIG. 17. In particular, the embodiment of FIG. 17 shows a 4G network causing a new DETACH notification 1720 to be sent between a P-GW 1710 and an MME 1712. For example, the DETACH notification 1720 may to be sent from the SPEF associated with P-GW 1710.

DETACH notification 1720 provides an indication that the observed traffic behavior is outside an expected range.

On receiving the DETACH notification 1720, the MME may perform a DETACH procedure as, for example, described in 3GPP TR 23.401 and in particular in section 5.8.3.1 of that TR. Such DETACH procedure is shown by block 1730 in the embodiment of FIG. 17.

Based on the DETACH procedure, the P-GW 1710 will receive a delete session request and send a delete session response for the requested user data PDU's session (not shown).

Upon conclusion of the DETACH procedure at block 1730, the MME 1712 sends a final DETACH acknowledgement, shown by message 1740, to the P-GW 1710. In particular, the DETACH acknowledgement 1740 may be sent to the SPEF associated with the P-GW 1710.

One example of changes to 3GPP TR 23.401 that could be made for the above detach procedure are shown in Appendix E below.

For a 5G network, a similar detach procedure could be utilized.

The above therefore provides for the ability to reduce processing power and increase battery life of potentially millions of UEs deployed in IoT applications by removing the need to run integrity and confidentiality at the radio interface. Further, a reduction is created in over the air data transfer that is needed to support integrity, which results in more bandwidth available for the network to support other customers.

The embodiments further offer protection to the network for potential misuse of the radio interface against spoofing and DoS attacks.

The embodiments described above can also provide protection for a device owner or user if the device was stolen and/or the subscription used fraudulently.

Further, a malfunctioning device may be detected in accordance with the embodiments described above, thus protecting the network and device owner or user.

The modules, mobile entities, and user equipments and devices described above may be any computing device or network node. Such computing device or network node may include any type of electronic device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 18:
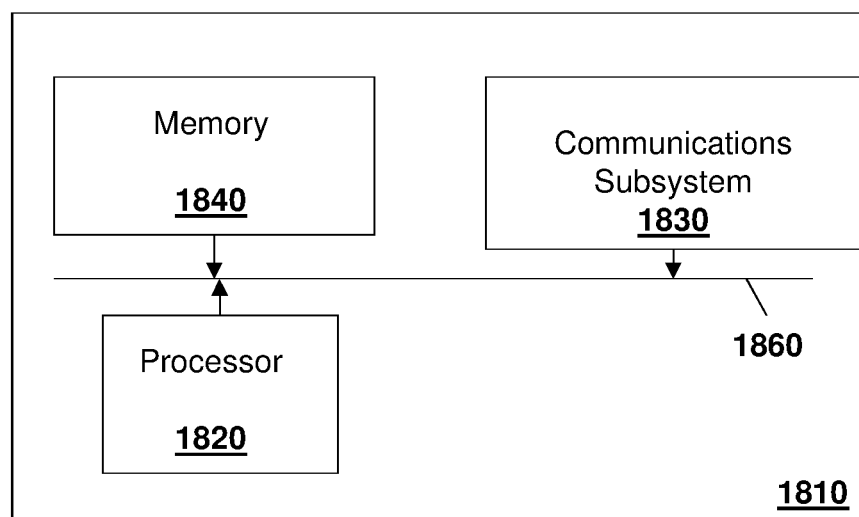
FIG. 18 is a block diagram showing a simplified computing device capable of being used with the method and embodiments of the present disclosure.

One simplified diagram of a computing device is shown with regard to FIG. 18. The computing device of FIG. 18 could be any UE, Mobile Entity (ME), network node such as UPF, SPEF, or other node as described above.

In FIG. 18, device 1810 includes a processor 1820 and a communications subsystem 1830, where the processor 1820 and communications subsystem 1830 cooperate to perform the methods of the embodiments described above. Communications subsystem 1820 may, in some embodiments, comprise multiple subsystems, for example for different radio technologies.

Processor 1820 is configured to execute programmable logic, which may be stored, along with data, on device 1810, and shown in the example of FIG. 18 as memory 1840. Memory 1840 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1840, device 1810 may access data or programmable logic from an external storage medium, for example through communications subsystem 1830.

Communications subsystem 1830 allows device 1810 to communicate with other devices or network elements and may vary based on the type of communication being performed. Further, communications subsystem 1830 may comprise a plurality of communications technologies, including any wired or wireless communications technology.

Communications between the various elements of device 1810 may be through an internal bus 1860 in one embodiment. However, other forms of communication are possible.

Further, if the computing station is a user equipment, one example user equipment is described below with regard to FIG. 19.

User equipment 1900 may comprise a two-way wireless communication device having voice or data communication capabilities or both. User equipment 1900 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, a mobile entity, an embedded cellular modem or a data communication device, as examples.

Where user equipment 1900 is enabled for two-way communication, it may incorporate a communication subsystem 1911, including a receiver 1912 and a transmitter 1914, as well as associated components such as one or more antenna elements 1916 and 1918, local oscillators (LOs) 1913, and a processing module such as a digital signal processor (DSP) 1920. As will be apparent to those skilled in the field of communications, the particular design of the communication subsystem 1911 will be dependent upon the communication network in which the user equipment is intended to operate.

Network access requirements will also vary depending upon the type of network 1919. In some networks, network access is associated with a subscriber or user of the user equipment 1900. A user equipment may be provided with an embedded or a removable user identity module (RUIM) or a subscriber identity module (SIM) card or a UMTS SIM (USIM) in order to operate on a network. The USIM/SIM/RUIM interface 1944 is normally similar to a card-slot into which a USIM/SIM/RUIM card can be inserted and ejected. The USIM/SIM/RUIM card can have memory and hold many key configurations 1951, and other information 1953 such as identification, and subscriber related information. In other cases, rather than a network 1919, user equipment 1900 may communicate with a non-access node, such as a vehicle, roadside infrastructure, another user equipment, or other peer-to-peer communication.

When required network registration or activation procedures have been completed, user equipment 1900 may send and receive communication signals over the network 1919. As illustrated in FIG. 19, network 1919 can include multiple base stations communicating with the user equipment.

Signals received by antenna 1916 through communication network 1919 are input to receiver 1912, which may perform such common receiver functions as signal amplification, frequency down conversion, filtering, channel selection and the like. Analog to digital (A/D) conversion of a received signal allows more complex communication functions such as demodulation and decoding to be performed in the DSP 1920. In a similar manner, signals to be transmitted are processed, including modulation and encoding for example, by DSP 1920 and input to transmitter 1914 for digital to analog (D/A) conversion, frequency up conversion, filtering, amplification and transmission over the communication network 1919 via antenna 1918. DSP 1920 not only processes communication signals, but also provides for receiver and transmitter control. For example, the gains applied to communication signals in receiver 1912 and transmitter 1914 may be adaptively controlled through automatic gain control algorithms implemented in DSP 1920.

User equipment 1900 generally includes a processor 1938 which controls the overall operation of the device. Communication functions, including data and voice communications, are performed through communication subsystem 1911. Processor 1938 also interacts with further device subsystems such as the display 1922, flash memory 1924, random access memory (RAM) 1926, auxiliary input/output (I/O) subsystems 1928, serial port 1930, one or more keyboards or keypads 1932, speaker 1934, microphone 1936, other communication subsystem 1940 such as a short-range communications subsystem or DSRC subsystem, and any other device subsystems generally designated as 1942. Serial port 1930 could include a USB port, On-Board Diagnostics (OBD) port or other port known to those in the art.

Figure 19:
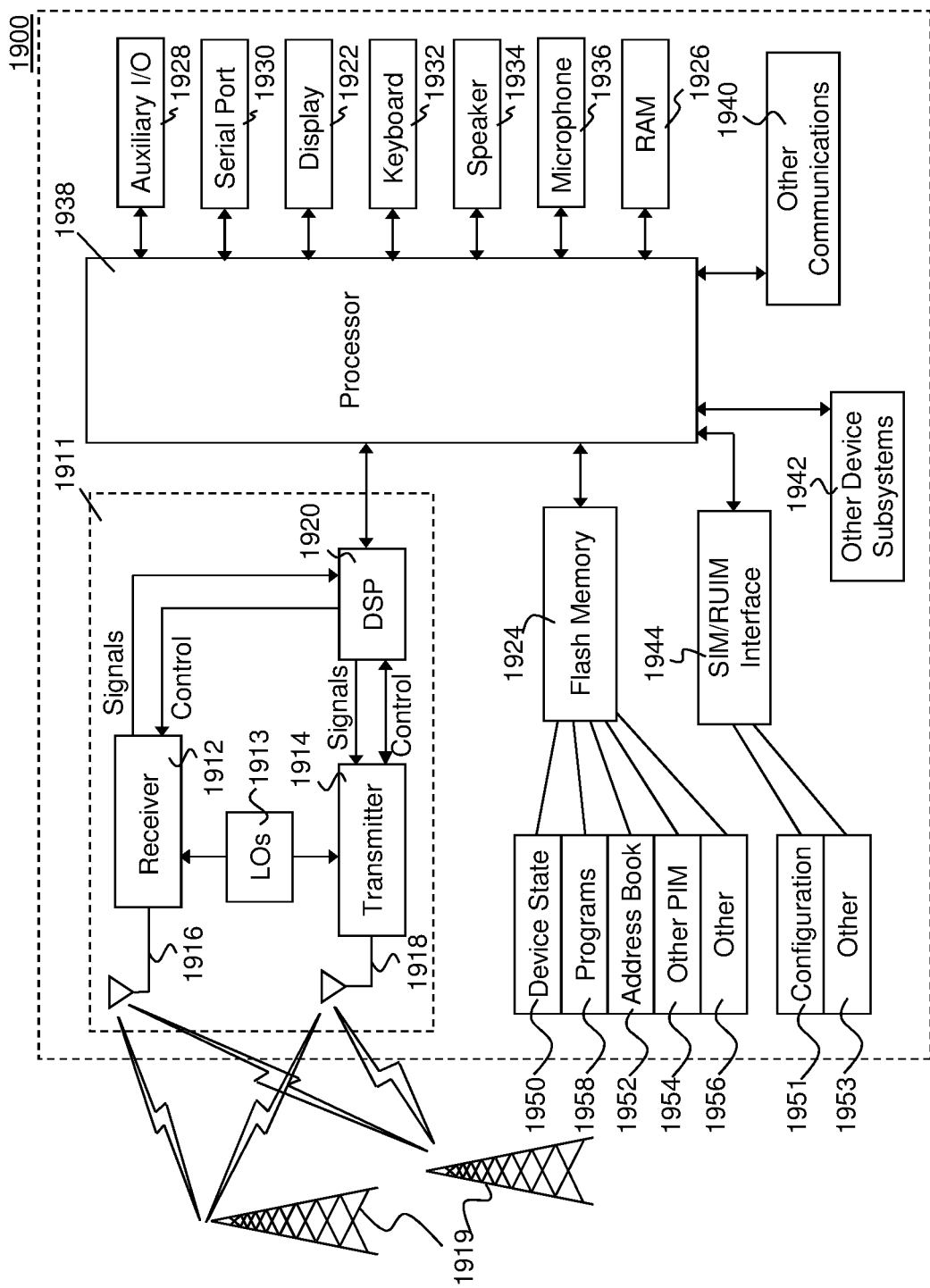
FIG. 19 is a block diagram of an example user equipment capable of being used with the methods and embodiments of the present disclosure.

Some of the subsystems shown in FIG. 19 perform communication-related functions, whereas other subsystems may provide "resident" or on-device functions. Notably, some subsystems, such as keyboard 1932 and display 1922, for example, may be used for both communication-related functions, such as entering a text message for transmission over a communication network, and device-resident functions such as a calculator or task list.

Operating system software used by the processor 1938 may be stored in a persistent store such as flash memory 1924, which may instead be a read-only memory (ROM) or similar storage element (not shown). Those skilled in the art will appreciate that the operating system, specific device applications, or parts thereof, may be temporarily loaded into a volatile memory such as RAM 1926. Received communication signals may also be stored in RAM 1926.

As shown, flash memory 1924 can be segregated into different areas for both computer programs 1958 and program data storage 1950, 1952, 1954 and 1956. These different storage types indicate that each program can allocate a portion of flash memory 1924 for their own data storage requirements. Processor 1938, in addition to its operating system functions, may enable execution of software applications on the user equipment. A predetermined set of applications that control basic operations, including potentially data and voice communication applications for example, will normally be installed on user equipment 1900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, voice mails, appointments, and task items. Further applications, including productivity applications, social media applications, games, among others, may also be loaded onto the user equipment 1900 through the network 1919, an auxiliary I/O subsystem 1928, serial port 1930, short-range communications subsystem 1940 or any other suitable subsystem 1942, and installed by a user in the RAM 1926 or a non-volatile store (not shown) for execution by the processor 1938. Such flexibility in application installation increases the functionality of the device and may provide enhanced on-device functions, communication-related functions, or both.

In a data communication mode, a received signal such as a text message or web page download will be processed by the communication subsystem 1911 and input to the processor 1938, which may further process the received signal for output to the display 1922, or alternatively to an auxiliary I/O device 1928.

A user of user equipment 1900 may also compose data items such as messages for example, using the keyboard 1932, which may be a complete alphanumeric keyboard or telephone-type keypad, either physical or virtual, among others, in conjunction with the display 1922 and possibly an auxiliary I/O device 1928. Such composed items may then be transmitted over a communication network through the communication subsystem 1911.

Where voice communications are provided, overall operation of user equipment 1900 is similar, except that received signals may typically be output to a speaker 1934 and signals for transmission may be generated by a microphone 1936. Alternative voice or audio I/O subsystems, such as a voice message recording subsystem, may also be implemented on user equipment 1900. Although voice or audio signal output is preferably accomplished primarily through the speaker 1934, display 1922 may also be used to provide an indication of the identity of a calling party, the duration of a voice call, or other voice call related information for example.

Serial port 1930 in FIG. 19 may be implemented in a user equipment for which synchronization with a user's desktop computer (not shown) may be desirable, but is an optional device component. Such a port 1930 may enable a user to set preferences through an external device or software application and may extend the capabilities of user equipment 1900 by providing for information or software downloads to user equipment 1900 other than through a wireless communication network. As will be appreciated by those skilled in the art, serial port 1930 can further be used to connect the user equipment to a computer to act as a modem or for charging a battery on the user equipment.

Other communications subsystems 1940, such as a short-range communications subsystem, is a further component which may provide for communication between user equipment 1900 and different systems or devices, which need not necessarily be similar devices. For example, the subsystem 1940 may include an infrared device and associated circuits and components or a Bluetooth™ or Bluetooth™ Low Energy communication module to provide for communication with similarly enabled systems and devices. Subsystem 1940 may further include non-cellular communications such as Wi-Fi or WiMAX, or near field communications, and in accordance with the embodiments above such radio may be capable of being split in some circumstances.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

APPENDIX A—EXTRACT FROM 33.401

5.1.3 User Data and Signalling Data Confidentiality
5.1.3.1 Ciphering Requirements
Ciphering may be provided to RRC-signalling to prevent UE tracking based on cell level measurement reports, handover message mapping, or cell level identity chaining. RRC signalling confidentiality is an operator option.

All S1 and X2 messages carried between RN and DeNB shall be confidentiality-protected.
NOTE 0: Encryption is subject to national regulation.
Synchronization of the input parameters for ciphering shall be ensured for the protocols involved in the ciphering.
The NAS signalling may be confidentiality protected. NAS signalling confidentiality is an operator option.
    NOTE 1: RRC and NAS signalling confidentiality protection is recommended to be used.
When authentication of the credentials on the UICC during Emergency Calling in Limited Service Mode, as defined in the TS 23.401 [2], can not be successfully performed, the confidentiality protection of the RRC and NAS signaling, and user plane shall be omitted (see clause 15). This shall be accomplished by the network by selecting EEA0 for confidentiality protection of NAS, RRC and user plane.
User plane confidentiality protection over the access stratum shall be done at PDCP layer and is an operator option.
    NOTE 2: User plane confidentiality protection is recommended to be used.
    NOTE 3: Confidentiality protection for RRC and UP is applied at the PDCP layer, and no layers below PDCP are confidentiality protected. Confidentiality protection for NAS is provided by the NAS protocol.
User data sent via MME may be confidentiality protected
    NOTE 4: Confidentiality protection of user data sent via MME is recommended to be used.
5.1.4 User Data and Signalling Data Integrity
5.1.4.1 Integrity Requirements
Synchronization of the input parameters for integrity protection shall be ensured for the protocols involved in the integrity protection.
Integrity protection, and replay protection, shall be provided to NAS and RRC-signalling.
All NAS signaling messages except those explicitly listed in TS 24.301 [9] as exceptions shall be integrity-protected. All RRC signaling messages except those explicitly listed in TS 36.331 [21] as exceptions shall be integrity-protected.
When authentication of the credentials on the UICC during Emergency Calling in Limited Service Mode, as defined in the TS 23.401 [2], can not be successfully performed, the integrity and replay protection of the RRC and NAS signaling shall be omitted (see clause 15). This shall be accomplished by the network by selecting EIA0 for integrity protection of NAS and RRC. EIA0 shall only be used for unauthenticated emergency calls.
User plane packets between the eNB and the UE shall not be integrity protected on the Uu interface. User plane packets between the RN and the UE shall not be integrity protected. All user plane packets carrying S1 and X2 messages between RN and DeNB shall be integrity-protected. Integrity protection for all other user plane packets between RN and DeNB may be supported.
All user data packets sent via the MME shall be integrity protected.
7.3 UP Security Mechanisms
7.3.1 UP Confidentiality Mechanisms
The user plane data is ciphered by the PDCP protocol between the UE and the eNB as specified in TS 36.323 [12]. The use and mode of operation of the 128-EEA algorithms are specified in Annex B.
The input parameters to the 128-bit EEA algorithms as described in Annex B are an 128-bit cipher key $K_{UPenc}$ as KEY, a 5-bit bearer identity BEARER which value is assigned as specified by TS 36.323 [12], the 1-bit direction of transmission DIRECTION, the length of the keystream required LENGTH and a bearer specific, time and direction dependent 32-bit input COUNT which corresponds to the 32-bit PDCP COUNT.

7.3.2 UP Integrity Mechanisms

This subclause applies only to the user plane on the Un interface between RN and DeNB:

The user plane data is integrity-protected by the PDCP protocol between the RN and the DeNB as specified in TS 36.323 [12]. Replay protection shall be activated when integrity protection is activated. Replay protection shall ensure that the receiver only accepts each particular incoming PDCP COUNT value once using the same AS security context.

The use and mode of operation of the 128-EIA algorithms are specified in Annex B.

The input parameters to the 128-bit EIA algorithms as described in Annex B are a 128-bit integrity key $K_{UPint}$ as KEY, a 5-bit bearer identity BEARER which value is assigned as specified by TS 36.323 [12], the 1-bit direction of transmission DIRECTION, and a bearer specific, time and direction dependent 32-bit input COUNT which corresponds to the 32-bit PDCP COUNT.

The supervision of failed UP integrity checks shall be performed both in the RN and the DeNB. In case of failed integrity check (i.e. faulty or missing MAC-I) is detected after the start of integrity protection, the concerned message shall be discarded. This can happen on the DeNB side or on the RN side.

NOTE: The handling of UP integrity check failures by an RN is an implementation issue. TS 36.323 [12] intentionally does not mandate any action for a failed integrity check (not even sending an indication of failure to higher layers). Consequently, depending on the implementation, the message failing integrity check is, or is not, silently discarded. This is in contrast to the handling of a failed RRC integrity check by a UE, cf. the NOTE in clause 7.4.1 of the present document.

APPENDIX B—EXTRACT FROM 33.401 SECTION 6 AUTHENTICATION 6.1 Authentication and Key Agreement 6.1.1 AKA Procedure NOTE 1: Authentication data in this subclause stands for EPS Authentication vector(s).

EPS AKA is the authentication and key agreement procedure that shall be used over E-UTRAN.

A Rel-99 or later USIM application on a UICC shall be sufficient for accessing E-UTRAN, provided the USIM application does not make use of the separation bit of the AMF in a way described in TS 33.102 [4] Annex F.

Access to E-UTRAN with a 2G SIM or a SIM application on a UICC shall not be granted.

An ME that has E-UTRAN radio capability shall support the USIM-ME interface as specified in TS 31.102

EPS AKA shall produce keying material forming a basis for user plane (UP), RRC, and NAS ciphering keys as well as RRC and NAS integrity protection keys.

NOTE 2: Key derivation requirements of AS and NAS keys can be found in subclause 7.2.1.

The MME sends to the USIM via ME the random challenge RAND and an authentication token AUTN for network authentication from the selected authentication vector. It also includes a $KSI_{ASME}$ for the ME which will be used to identify the $K_{ASME}$ (and further keys derived from the $K_{ASME}$) that results from the EPS AKA procedure.

At receipt of this message, the USIM shall verify the freshness of the authentication vector by checking whether AUTN can be accepted as described in TS 33.102. If so, the USIM computes a response RES. USIM shall compute CK and IK which are sent to the ME. If the USIM computes a Kc (i.e. GPRS Kc) from CK and IK using conversion function c3 as described in TS 33.102, and sends it to the ME, then the ME shall ignore such GPRS Kc and not store the GPRS Kc on USIM or in ME. If the verification fails, the USIM indicates to the ME the reason for failure and in the case of a synchronisation failure passes the AUTS parameter (see TS 33.102).

An ME accessing E-UTRAN shall check during authentication that the "separation bit" in the AMF field of AUTN is set to 1. The "separation bit" is bit 0 of the AMF field of AUTN.

NOTE 3: This separation bit in the AMF can not be used anymore for operator specific purposes as described by TS 33.102, Annex F.

NOTE 4: If the keys CK, IK resulting from an EPS AKA run were stored in the fields already available on the USIM for storing keys CK and IK this could lead to overwriting keys resulting from an earlier run of UMTS AKA. This would lead to problems when EPS security context and UMTS security context were held simultaneously (as is the case when security context is stored e.g. for the purposes of Idle Mode Signaling Reduction). Therefore, "plastic roaming" where a UICC is inserted into another ME will necessitate an EPS AKA authentication run if the USIM does not support EMM parameters storage.

UE shall respond with User authentication response message including RES in case of successful AUTN verification and successful AMF verification as described above. In this case the ME shall compute $K_{ASME}$ from CK, IK, and serving network's identity (SN id) using the KDF as specified in clause A.2. SN id binding implicitly authenticates the serving network's identity when the derived keys from $K_{ASME}$ are successfully used.

NOTE 5: This does not preclude a USIM (see TS 31.102) in later releases having the capability of deriving $K_{ASME}$.

Otherwise UE shall send an authentication failure message with a CAUSE value indicating the reason for failure. In case of a synchronisation failure of AUTN (as described in TS 33.102), the UE also includes AUTS that was provided by the USIM. Upon receipt of an authentication failure message, the MME may initiate further identity requests and authentications towards the UE. (see TS 24.301).

The MME checks that the RES equals XRES. If so the authentication is successful. If not, depending on type of identity used by the UE in the initial NAS message, the MME may initiate further identity requests or send an authentication reject message towards the UE (see TS 24.301 [9]).

FIG. 6.1.1-1 describes EPS AKA procedure, which is based on UMTS AKA (see TS 33.102[4]). The following keys are shared between UE and HSS: K is the permanent key stored on the USIM on a UICC and in the Authentication Centre AuC.

CK, IK is the pair of keys derived in the AuC and on the USIM during an AKA run. CK, IK shall be handled differently depending on whether they are used in an EPS security context or a legacy security context, as described in subclause 6.1.2.

As a result of the authentication and key agreement, an intermediate key $K_{ASME}$ shall be shared between UE and MME i.e. the ASME for EPS.

APPENDIX C—CHANGES TO TR 33.866

Under Security area #1 Architectural aspects of Next Generation security, add

** FIRST CHANGE **

[All Text Below is New, Section Numbering May Need Correcting]

5.1.3.22 Key Issue #1.22: UP Session Security Policy Enforcement Function 5.1.3.22.1 Key Issue Details UEs that select to establish a data session that does not use UP integrity or confidentiality may provide a means for an attacker to use the session to attack the network at the RAN or higher layers.

5.1.3.22.2 Security Threats

A data session with no integrity or confidentiality protection could be hijacked by an attacker. We are primarily interested in threats to the network, since if the UE has selected a data session with no integrity or confidentiality it is assumed it has accepted those risks such as eavesdropping. Threats to the network are the interest in this key issue, an unprotected data session could allow an attacker to;
- Flood the network with rogue data (a DoS attack), where the data flood would go beyond the eNB to the UPF, since there is no protection at the PDCP layer.
- Impersonate the UE and send malicious or corrupt data to the receiver
- Hijack the session connection for it's own purposes.

5.1.3.22.3 Potential Security Requirements

The security requirement is to protect the network at a layer beyond the RAN or above the PDCP layer, but to also not reduce to the benefits to the application/UE that may be gained by a UP session that does not invoke integrity and confidentiality.

A requirement to protect the network in a way that is passive to the UP data connection user, but to ensures the network can be aware of a mis-use of its service.

** SECOND CHANGE **

[All Text Below is New, Section Numbering May Need Correcting]

5.1.4.40 Solution #1.40: UP Session Security Policy Enforcement Function 5.1.4.40.1 Introduction This solution proposes a UP session Security Policy Enforcement Function (SPEF) in the UPF and is a solution for key issue #22 in 5.1.3.22

5.1.4.40.2 Solution Details

The network operator uses a set of parameters associated with the UE traffic characteristics to provide the UPF with the parameters it needs to ensure the UE is behaving within the limits of the expected characteristics. These values can be manually configured into the PCF or SPCF (or the UE Subscription Information in the HSS in LTE). These values can be, but are not limited to:

TABLE 1

Security Policy Enforcement Function parameters

| Name | Description |
| --- | --- |
| SPE_LOC | UE LOCation: GPS co-ordinates including location/movement/speed behaviour or other information regarding the physical location of the UE (cell-id). These may be known apriori for many UEs such as stationary UEs (e.g. smart meters). |
| SPE_VOLUME | Estimated data payload volume. This may be specified in the subscription parameters (e.g. available in the HSS) |
| SPE_TOD | Expected Time of Day/Day of Week/Day of Month etc., for connection set up |
| SPE_CONNS | Expected number of simultaneous data connections (TCP/IP) from the UE |
| SPE_DUR | Expected duration of connection |
| SPE_FREQ | Estimated Frequency of data transmission (once per hour/minute/second, or continuous) |
| SPE_DATATYPE | Type of data; text, numeric, video stream, audio stream, graphics (.jpg, .gif, .pdf), encrypted payload (where the encryption is done at a layer above the radio layer i.e. application layer) |
| SPE_IPADDR | Normal destination address (IP address, URI, or domain name or sub-domain) |
| SPE_BYTES | Exchange of byte counts transmitted and received between the UE and Network over a specific connection. See Prior Art section below. |
| SPE_CAPABILITY | Permitted subscription usage. For example, data only (no SMS, multi-media, voice (VoIP) traffic allowed). |

These values are used by the SPEF in the UPF to monitor the traffic over a specific PDU session from a specific UE. If the observed traffic characteristics fall out of the range of acceptable values, the SPEF and signal the AMF to terminate the connection or reset the connection using integrity and/or confidentiality protection.

This solution is based on the 5G architecture where the UP security terminates in the UPF.

From 23.501 v0.3.0, FIG. 4.2.3-2: Non-Roaming 5G System Architecture in Reference Point Representation A NG-UE requests a PDU session establishment for a DN (Data Network) using a NAS message. When the AMF receives the PDU session establishment from the NG-UE, the AMF determines an SMF based on the DNN (Data Network Name) and forwards the session establishment to the SMF along with the NG-UE identity and DNN. The SMF interacts with the PCF to obtain the requirements for the PDU session.

The SMF obtains a key (i.e., $K_{UPF}$) for the UPF security from the SEAF and provides the key ($K_{UPF}$) to the UPF as a part of the PDU session configuration at the UPF so that the UPF can apply UPF security for the NG-UE. Included in this PDU session configuration at the UPF are the parameters for monitoring the traffic characteristics of the NG-UE. The SMF also provides the session information and key derivation parameters to the NG-UE so that the NG-UE derives the same key as UPF and starts UPF security protection. In the case of a PDU session with no Integrity or Confidentiality the key provided to the UPF ($K_{UPF}$) would be null.

5.1.4.40.2.1 Procedure

10. PDU Session Configuration Request (Identity, DNN, $K_{UPF}$)

FIG. 5.1.4.x.2.1.3-1. PDU Session Establishment for UP Security Termination at UPF (SEE FIG. 5)

1. The NG-UE attaches to the network.
2. The NG-UE sends a PDU session establishment request to the AMF with DNN.

NOTE: It is assumed that the UE security capability (including the UP security capability) is stored in the AMF during the attach. Alternatively, the NG-UE may provide its UP security capability at this step.
3. The AMF determines an SMF based on the DNN provided by the NG-UE.
4. The AMF forwards the PDU session establishment request to the SMF with the UE identity, DNN and security capability.
5. The SMF interacts with PCF to retrieve the UE's subscription profile related to the requested PDU session.
6. The SMF checks whether the NG-UE is authorized to establish the requested PDU session and determines the UP security termination.
7. If the NG-UE is authorized to establish the PDU session and UPF security termination is required for the PDU session, the SMF requests a key for the UPF to the SEAF. The SMF provides the SEAF with the UE identity, DNN and SMF ID.
8. The SEAF derives a UPF key ($K_{UPF}$) from the $K_{SEAF}$ by incorporating the parameters received from the SMF and a locally managed counter (i.e., $CNT_{UPF}$) for UPF key derivation.
9. The SEAF sends a key response to the SMF. The key response includes the $K_{UPF}$ and $CNT_{UPF}$ used for the key derivation (e.g., the counter in step 8).
10. The SMF sends a PDU session configuration request to the UPF containing the security configuration information for the PDU session (e.g., ciphering and/or integrity protection algorithm) including the $K_{UPF}$, and Traffic Characteristics for the PDU session.
11. The UPF installs the $K_{UPF}$ for the session as a part of PDU session configuration and derive subsequent keys ($K_{UPFEnc}$, $K_{UPFInt}$) based on the security configuration information. The keys are associated with a Key ID—which may also be incorporated in the key derivation. If integrity and confidentiality protection are not applied to the PDU Session the KUPF is null and there is no derivation of subsequent keys.
    In addition, the UPF configures the Security Policy Enforcement Function with the traffic characteristic parameters received from the PCF for this PDU session.
12. The UPF sends a PDU session configuration response to the SMF containing the PDU session ID, Key ID, and other parameters (if exist) used for key derivation.
13. The SMF sends a PDU session establishment response to the NG-UE via the AMF. This response message includes all keying materials (e.g., $CNT_{UPF}$, Key ID) that are needed for the NG-UE to derive the same keys as UPF.
14. The NG-UE derives $K_{UPF}$ and subsequent keys based on the session establishment response.
15. The NG-UE sends a PDU session establishment complete message to the SMF via the AMF.

After completion of the step 15, the NG-UE and UPF protect the UP packets based on the PDU session security configuration terminating at UPF, which would include the SPEF.

5.1.40.3 Evaluation

TBD

** END OF CHANGES **

APPENDIX D—CHANGES TO TR 23.401 ATTACH

This CR adds parameters to the Create Session Request message sent from the MME to the Serving Gateway and to the PDN-GW which will carry the parameters needed by the SPEF in the PDN-GW. The MME obtains the SPEF from the HSS subscription context for the UE.

The parameter added include;

TABLE 1

Security Policy Enforcement Function parameters

| Name | Description |
| --- | --- |
| SPE_LOC | UE LOCation: GPS co-ordinates including location/movement/speed behaviour or other information regarding the physical location of the UE (cell-id). These may be known apriori for many UEs such as stationary UEs (e.g. smart meters). |
| SPE_VOLUME | Estimated data payload volume. This may be specified in the subscription parameters (e.g. available in the HSS) |
| SPE_TOD | Expected Time of Day/Day of Week/Day of Month etc., for connection set up |
| SPE_CONNS | Expected number of simultaneous data connections (TCP/IP) from the UE |
| SPE_DUR | Expected duration of connection |
| SPE_FREQ | Estimated Frequency of data transmission (once per hour/minute/second, or continuous) |
| SPE_DATATYPE | Type of data; text, numeric, video stream, audio stream, graphics (.jpg, .gif, .pdf), encrypted payload (where the encryption is done at a layer above the radio layer i.e. application layer) |
| SPE_IPADDR | Normal destination address (IP address, URI, or domain name or sub-domain) |
| SPE_BYTES | Exchange of byte counts transmitted and received between the UE and Network over a specific connection. See Prior Art section below. |
| SPE_CAPABILITY | Permitted subscription usage. For example, data only (no SMS, multi-media, voice (VoIP) traffic allowed). |

** FIRST CHANGE **

[The Steps not Relevant to the Change are Removed for Clarity]

5.3.2.1 E-UTRAN Initial Attach

[SEE FIG. 6]

12. If an ESM container was not included in the Attach Request, steps 12, 13,14,15,16 are skipped.
    For an Emergency Attach the MME applies the parameters from MME Emergency Configuration Data for the emergency bearer establishment performed in this step and any potentially stored IMSI related subscription data are ignored by the MME.
    If the UE performs Initial or Handover Attach via a CSG cell and there is no subscription for that CSG or the CSG subscription is expired the MME shall reject the Attach Request with an appropriate cause. If the UE has this CSG ID and associated PLMN on its Allowed CSG list the UE shall remove the CSG ID and associated PLMN from the list when receiving this reject cause.

If a subscribed PDN address is allocated for the UE for this APN, the PDN subscription context contains the UE's IPv4 address and/or the IPv6 prefix and optionally the PDN GW identity. If the PDN subscription context contains a subscribed IPv4 address and/or IPv6 prefix, the MME indicates it in the PDN address. For Request Type indicating "Initial request", if the UE does not provide an APN, the MME shall use the PDN GW corresponding to the default APN for default bearer activation.

If the UE provides an APN, this APN shall be employed for default bearer activation. For Request Type indicating "Handover", if the UE provides an APN, the MME shall use the PDN GW corresponding to the provided APN for default bearer activation, If the UE does not provide an APN, and the subscription context from HSS contains a PDN GW identity corresponding to the default APN, the MME shall use the PDN GW corresponding to the default APN for default bearer activation. The case where the Request Type indicates "Handover" and the UE does not provide an APN, and the subscription context from HSS does not contain a PDN GW identity corresponding to the default APN constitutes an error case. If the Request Type indicates "Initial request" and the selected PDN subscription context contains no PDN GW identity the new MME selects a PDN GW as described in clause 4.3.8.1 on PDN GW selection function (3GPP accesses). If the PDN subscription context contains a dynamically allocated PDN GW identity and the Request Type does not indicate "Handover" the MME may select a new PDN GW as described in clause PDN GW selection function, e.g. to allocate a PDN GW that allows for more efficient routing.

For initial and handover Emergency Attach the MME uses the PDN GW Selection function defined in clause 4.3.12.4 to select a PDN GW.

If the subscription context does not indicate that the APN is for a PDN connection to an SCEF, the new MME selects a Serving GW as described in clause 4.3.8.2 on Serving GW selection function and allocates an EPS Bearer Identity for the Default Bearer associated with the UE. Then it sends a Create Session Request (IMSI, MSISDN, MME TEID for control plane, PDN GW address, PDN Address, APN, RAT type, Default EPS Bearer QoS, PDN Type, APN-AMBR, EPS Bearer Identity, Protocol Configuration Options, Handover Indication, ME Identity (IMEISV), User Location Information (ECGI), UE Time Zone, User CSG Information, MS Info Change Reporting support indication, Selection Mode, Charging Characteristics, Trace Reference, Trace Type, Trigger Id, OMC Identity, Maximum APN Restriction, Dual Address Bearer Flag, the Protocol Type over S5/S8, Serving Network, Security Policy Enforcement Parameters) message to the selected Serving GW. If Control Plane CIoT EPS Optimisation applies, then the MME shall also indicate S11-U tunnelling of NAS user data and send its own S11-U IP address and MME DL TEID for DL data forwarding by the SGW. User CSG Information includes CSG ID, access mode and CSG membership indication.

For PDN type "non-IP" when Control plane CIoT EPS optimisations are enabled for the UE, if APN subscription data indicate a SCEF connection needs to be used, then the MME allocates an EPS Bearer Identity for the Default Bearer associated with the UE and establishes a connection to the SCEF address indicated in subscription data as per TS 23.682 [74] and the steps 12,13,14,15,16 are not executed. The rest of the interactions with the UE apply as specified below.

If the MME determines the PDN connection shall only use the Control Plane CIoT EPS Optimisation, the MME shall include a Control Plane Only PDN Connection Indicator in Create Session Request.

If the Request Type indicates "Emergency", Maximum APN restriction control shall not be performed.

For emergency attached UEs IMSI is included if available and if the IMSI cannot be authenticated then the IMSI shall be marked as unauthenticated.

The RAT type is provided in this message for the later PCC decision.

The RAT type shall distinguish between NB-loT and WB-E-UTRA types.

The subscribed APN-AMBR for the APN is also provided in this message. The MSISDN is included if provided in the subscription data from the HSS. Handover Indication is included if the Request Type indicates handover. Selection Mode indicates whether a subscribed APN was selected, or a non-subscribed APN sent by the UE was selected.

Charging Characteristics indicates which kind of charging the bearer context is liable for. The MME may change the requested PDN type according to the subscription data for this APN as described in clause 5.3.1.1. The MME shall set the Dual Address Bearer Flag when the PDN type is set to IPv4v6 and all SGSNs which the UE may be handed over to are Release 8 or above supporting dual addressing, which is determined based on node pre-configuration by the operator.

The Protocol Type over S5/S8 is provided to Serving GW which protocol should be used over S5/S8 interface.

The charging characteristics for the PS subscription and individually subscribed APNs as well as the way of handling Charging Characteristics and whether to send them or not to the P-GW is defined in TS 32.251 [44]. The MME shall include Trace Reference, Trace Type, Trigger Id, and OMC Identity if S-GW and/or P-GW trace is activated.

The MME shall copy Trace Reference, Trace Type, and OMC Identity from the trace information received from the HLR or OMC.

The Maximum APN Restriction denotes the most stringent restriction as required by any already active bearer context. If there are no already active bearer contexts, this value is set to the least restrictive type (see clause 15.4 of TS 23.060 [7]). If the P-GW receives the Maximum APN Restriction, then the P-GW shall check if the Maximum APN Restriction value does not conflict with the APN Restriction value associated with this bearer context request. If there is no conflict the request shall be allowed, otherwise the request shall be rejected with sending an appropriate error cause to the UE.

If the MME requires the eNB to check whether the UE radio capabilities are compatible with the network configuration (e.g. whether the SRVCC or frequency support by the UE matches that of the network) to be able to set the IMS voice over PS Session Supported Indication (see clause 4.3.5.8), then the MME may send a UE Radio Capability Match Request to the eNB as defined in clause 5.3.14.

13. The Serving GW creates a new entry in its EPS Bearer table and sends a Create Session Request (IMSI, MSISDN, APN, Serving GW Address for the user plane, Serving GW TEID of the user plane, Serving GW TEID of the control plane, RAT type, Default EPS Bearer QoS, PDN Type, PDN Address, subscribed APN-AMBR, EPS Bearer Identity, Protocol Configuration Options, Handover Indication, ME Identity, User Location Information (ECGI), UE Time Zone, User CSG Information, MS Info Change Reporting support indication, PDN Charging Pause Support indication, Selection Mode, Charging Characteristics, Trace Reference, Trace Type, Trigger Id, OMC Identity, Maximum APN Restriction, Dual Address Bearer Flag, Serving Network, Security Policy Enforcement Parameters) message to the PDN GW indicated by the PDN GW address received in the previous step. After this step, the Serving GW buffers any downlink packets it may receive from the PDN GW without sending a Downlink Data Notification message to the MME until it receives the Modify Bearer Request message in step 23 below. The MSISDN is included if received from the MME.

If the Serving GW has received the Control Plane Only PDN Connection Indicator in step 12, the Serving GW informs the PGW this information in Create Session Request. The Serving GW and PDN GW shall indicate the use of CP only on their CDRs.

PDN GWs shall not perform any checks of Maximum APN Restriction if Create Default Bearer Request includes the emergency APN.

For emergency attached UEs IMSI is included if available and if the IMSI cannot be authenticated then the IMSI shall be marked as unauthenticated.

In the case of handover attach, and if the PGW detects that the 3GPP PS Data Off UE Status has changed, the PGW shall indicate this event to the charging system for offline and online charging.

14. If dynamic PCC is deployed and the Handover Indication is not present, the PDN GW performs an IP-CAN Session Establishment procedure as defined in TS 23.203 [6], and thereby obtains the default PCC rules for the UE. This may lead to the establishment of a number of dedicated bearers following the procedures defined in clause 5.4.1 in association with the establishment of the default bearer, which is described in Annex F.

The IMSI, APN, UE IP address, User Location Information (ECGI), UE Time Zone, Serving Network, RAT type, APN-AMBR, Default EPS Bearer QoS, ETFTU (if ETFTU is not provided it means UE and/or the PDN GW does not support the extended TFT filter format) are provided to the PCRF by the PDN GW if received by the previous message. The User Location Information and UE Time Zone are used for location based charging. For emergency attached UEs which are unauthenticated the PDN GW provides the IMEI as the UE Identity instead of IMSI, to the PCRF. If the PCRF decides that the PDN connection may use the extended TFT filter format, it shall return the ETFTN indicator to the PDN GW for inclusion in the protocol Configuration Options returned to the UE.

The PCRF may modify the APN-AMBR and the QoS parameters (QCI and ARP) associated with the default bearer in the response to the PDN GW as defined in TS 23.203 [6].

If the PCC is configured to support emergency services and if dynamic PCC is deployed, the PCRF, based on the emergency APN, sets the ARP of the PCC rules to a value that is reserved for emergency services and the authorization of dynamic PCC rules as described in of TS 23.203 [6]. If dynamic PCC is not deployed, the PDN GW uses the ARP of the default emergency EPS bearer for any potentially initiated dedicated emergency EPS bearer. The P-GW determines that emergency services are requested based on the emergency APN received in Create Session Request message.

NOTE 10: While the PDN GW/PCEF may be configured to activate predefined PCC rules for the default bearer, the interaction with the PCRF is still required to provide e.g. the UE IP address information to the PCRF.

NOTE 11: If the IP address is not available when the PDN GW performs the IP-CAN Session Establishment procedure with the PCRF, the PDN GW initiates an IP-CAN Session Modification procedure to inform the PCRF about an allocated IP address as soon as the address is available. In this version of the specification, this is applicable only to IPv4 address allocation.

If dynamic PCC is deployed and the Handover Indication is present, the PDN GW executes a PCEF Initiated IP-CAN Session Modification procedure with the PCRF as specified in TS 23.203 [6] to report the new IP-CAN type. Depending on the active PCC rules, the establishment of dedicated bearers for the UE may be required. The establishment of those bearers shall take place in combination with the default bearer activation as described in Annex F. This procedure can continue without waiting for a PCRF response. If changes to the active PCC rules are required, the PCRF may provide them after the handover procedure is finished.

In both cases (Handover Indication is present or not), if dynamic PCC is not deployed, the PDN GW may apply local QoS policy. This may lead to the establishment of a number of dedicated bearers for the UE following the procedures defined in clause 5.4.1 in combination with the establishment of the default bearer, which is described in Annex F.

If the CSG information reporting triggers are received from the PCRF, the PDN GW should set the CSG Information Reporting Action IE accordingly.

The additional behaviour of the PGW for 3GPP PS Data Off is defined in TS 23.203.

15. The P-GW creates a new entry in its EPS bearer context table and generates a Charging Id for the Default Bearer. The new entry allows the P-GW to route user plane PDUs between the S-GW and the packet data network, and to start charging. The way the P-GW handles Charging Characteristics that it may have received is defined in TS 32.251. If the SPEF parameters are present the SPEF function will be invoked in the PDN-GW and will commence monitoring the user plan PDUs for this UE.

The PDN GW returns a Create Session Response (PDN GW Address for the user plane, PDN GW TEID of the user plane, PDN GW TEID of the control plane, PDN Type, PDN Address, EPS Bearer Identity, EPS Bearer QoS, Protocol Configuration Options, Charging Id, Prohibit Payload Compression, APN Restriction, Cause, MS Info Change Reporting Action (Start) (if the PDN GW decides to receive UE's location information during the session), CSG Information Reporting Action (Start) (if the PDN GW decides to receive UE's User CSG information during the session), Presence Reporting Area Action (if the PDN GW decides to receive notifications about a change of UE presence in Presence Reporting Area), PDN Charging Pause Enabled indication (if PDN GW has chosen to enable the function), APN-AMBR, Delay Tolerant Connection) message to the Serving GW.

The PDN GW takes into account the received PDN type, the Dual Address Bearer Flag and the policies of operator when the PDN GW selects the PDN type to be used as follows. If the received PDN type is IPv4v6 and both IPv4 and IPv6 addressing is possible in the PDN but the Dual Address Bearer Flag is not set, or only single IP version addressing for this APN is possible in the PDN, the PDN GW selects a single IP version (either IPv4 or IPv6). If the received PDN type is IPv4 or IPv6 or "Non IP", the PDN GW uses the received PDN type if it is supported in the PDN, otherwise an appropriate error cause will be returned. For IPv4, IPv6 and IPv4v6, the PDN GW allocates a PDN Address according to the selected PDN type. If the PDN GW has selected a PDN type different from the received PDN Type, the PDN GW indicates together with the PDN type IE a reason cause to the UE why the PDN type has been modified, as described in clause 5.3.1.1.

The PDN GW shall either accept or reject (but not modify) the PDN type if the PDN type is set to "Non IP". PDN Address may contain an IPv4 address for IPv4 and/or an IPv6 prefix and an Interface Identifier, or be omitted for PDN type "Non IP". If the PDN has been configured by the operator so that the PDN addresses for the requested APN shall be allocated by usage of DHCPv4 only, or if the PDN GW allows the UE to use DHCPv4 for address allocation according to the Address Allocation Preference received from the UE, the PDN Address shall be set to 0.0.0.0, indicating that the IPv4 PDN address shall be negotiated by the UE with DHCPv4 after completion of the Default Bearer Activation procedure. For external PDN addressing for IPv6, the PDN GW obtains the IPv6 prefix from the external PDN using either RADIUS or Diameter client function. In the PDN Address field of the Create Session Response, the PDN GW includes the Interface Identifier and IPv6 prefix. The PDN GW sends Router Advertisement to the UE after default bearer establishment with the IPv6 prefix information for all cases.

If the PDN address is contained in the Create Session Request, the PDN GW shall allocate the IPv4 address and/or IPv6 prefix contained in the PDN address to the UE. The IP address allocation details are described in clause 5.3.1 on "IP Address Allocation". The PDN GW derives the BCM based on the NRSU and operator policy. The PDN GW derives whether the extended TFT filter format is to be used based on the ETFTU, ETFTN received from the PCRF and operator policy.

Protocol Configuration Options contains the BCM, ETFTN as well as optional PDN parameters that the P-GW may transfer to the UE. These optional PDN parameters may be requested by the UE, or may be sent unsolicited by the P-GW. Protocol Configuration Options are sent transparently through the MME.

The PDN GW includes a Delay Tolerant Connection indication if the PDN GW supports receiving a rejection cause from the SGW indicating that the UE is temporarily not reachable due to power saving and holding mobile terminated procedures, until the PDN GW receives a message indicating that the UE is available for end to end signalling. When the Handover Indication is present, the PDN GW does not yet send downlink packets to the S-GW; the downlink path is to be switched at step 23a.

If the PDN GW is an L-GW, it does not forward downlink packets to the S-GW. The packets will only be forwarded to the HeNB at step 20 via the direct user plane path.

16. The Serving GW returns a Create Session Response (PDN Type, PDN Address, Serving GW address for User Plane, Serving GW TEID for S1-U User Plane, Serving GW TEID for control plane, EPS Bearer Identity, EPS Bearer QoS, PDN GW addresses and TEIDs (GTP-based S5/S8) or GRE keys (PMIP-based S5/S8) at the PDN GW(s) for uplink traffic, Protocol Configuration Options, Prohibit Payload Compression, APN Restriction, Cause, MS Info Change Reporting Action (Start), Presence Reporting Area Action, CSG Information Reporting Action (Start), APN-AMBR, Delay Tolerant Connection) message to the new MME. For Control Plane CIoT EPS optimisation, the Serving GW address for S11-U User Plane and Serving GW TEID are used by the MME to forward UL data to the SGW. If the 3GPP PS Data Off UE Status was present in the Create Session Request PCO and the PGW supports 3GPP PS Data Off feature, the PGW shall include the 3GPP PS Data Off Support Indication in the Create Session Response PCO.

** END OF CHANGES **

The invention claimed is:

1. A method at a network element for monitoring user plane traffic for a user equipment, the method comprising:

receiving, from the user equipment, a set of characteristics and a range of values for each of the set of characteristics for user plane traffic between the user equipment and the network element;

monitoring user plane traffic for the user equipment at the network element, the monitoring determining Whether at least one characteristic of the user plane traffic falls outside of the range of values, resulting in a characteristic violation; and if the at least one characteristic of the user plane traffic falls outside the range of values, performing an action resulting from the characteristic violation;

wherein the action comprises at least one of:
triggering alarms in a network management function of a public land mobile network;
triggering a secure message to the user equipment containing information associated with the characteristic violation;

dropping packets to or from the user equipment;
performing a connection re-establishment by performing DETACH procedure on the user equipment and further by performing an ATTACH procedure from the user equipment;
triggering an authentication procedure for the user equipment; and
turning on at least one of encryption or integrity protection;
wherein the receiving is performed during an ATTACH procedure between the user equipment and the network element.

2. The method of claim 1, wherein the user plane traffic is transmitted without at least one of integrity and encryption protection.

3. The method of claim 1, wherein the set of characteristics include at least one characteristic selected from the group comprising: the user equipment location; traffic volume to or from the user equipment; time of day for traffic for the user equipment; number of connections to the user equipment; duration of a session at the user equipment; a maximum number of data packets sent during a time period from the user equipment; a datatype for packets from the user equipment; a destination address for packets from the user equipment; and a permitted subscription usage for the user equipment.

4. The method of claim 1, wherein the action comprises triggering alarms in a network management function of a public land mobile network.

5. The method of claim 1, wherein the action comprises triggering a secure message to the user equipment containing information associated with the characteristic violation.

6. The method of claim 1, wherein the action comprises dropping packets to or from the user equipment.

7. The method of claim 1, wherein the action comprises performing a connection re-establishment by performing DETACH procedure on the user equipment and further by performing an ATTACH procedure from the user equipment.

8. The method of claim 1, wherein the action triggers an authentication procedure for the user equipment.

9. The method of claim 2, wherein the action comprises turning on at east one of encryption or integrity protection.

10. A network element for monitoring user plane traffic for a user equipment, the network element comprising:
a processor;
a communications subsystem, and
a memory;
wherein the processor, the communications subsystem, and the memory cooperate to:
receive, from the user equipment, a set of characteristics and a range of values for each of the set of characteristics for user plane traffic between the user equipment and the network element;
monitor user plane traffic for the user equipment at the network element, the monitoring determining whether at least one characteristic of the user plane traffic falls outside of the range of values, resulting in a characteristic violation; and
if the at least one characteristic of the user plane traffic falls outside the range of values, perform an action resulting from the characteristic violation;
wherein the action comprises at least one of:
triggering alarms in a network management function of a public land mobile network;
triggering a secure message to the user equipment containing information associated with the characteristic violation;
dropping packets to or from the user equipment;
performing a connection re-establishment by performing DETACH procedure on the user equipment and further by performing an ATTACH procedure from the user equipment;
triggering an authentication procedure for the user equipment; and
turning on at least one of encryption or integrity protection;
wherein the receiving is performed during an ATTACH procedure between the user equipment and the network element.

11. The network element of claim 10, wherein the user plane traffic is transmitted without integrity or encryption protection.

12. The network element of claim 10, wherein the set of characteristics include at least one characteristic selected from the group comprising: the user equipment location; traffic volume to or from the user equipment; time of day for traffic for the user equipment; number of connections to the user equipment; duration of a session at the user equipment; a maximum number of data packets sent during a time period from the user equipment; a datatype for packets from the user equipment; a destination address for packets from the user equipment; and a permitted subscription usage for the user equipment.

13. The network element of claim 10, wherein the action comprises triggering alarms in a network management function of a public land mobile network.

14. The network element of claim 10, wherein the action comprises triggering a secure message to the user equipment containing information associated with the characteristic violation.

15. The network element of claim 10, wherein the action comprises dropping packets to or from the user equipment.

16. The network element of claim 10, wherein the action comprises performing a connection re-establishment by performing DETACH procedure on the user equipment and further by performing an ATTACH procedure from the user equipment.

17. The network element of claim 10, wherein the action triggers an authentication procedure for the user equipment.

18. The network element of claim 2, wherein the action comprises turning on at least one of encryption or integrity protection.

19. A non-transitory computer readable medium for storing program instructions for monitoring user plane traffic for a user equipment, which when executed by a processor of a network element cause the network element to:
receive, from the user equipment, a set of characteristics and a range of values for each of the set of characteristics for user plane traffic between the user equipment and the network element;
monitor user plane traffic for the user equipment at the network element, the monitoring determining whether at least one characteristic of the user plane traffic falls outside of the configured range of values, resulting in a characteristic violation; and
if the at least one characteristic of the user plane traffic falls outside the configured range of values, perform an action resulting from the characteristic violation;
wherein the action comprises at least one of:
triggering alarms in a network management function of a public land mobile network;
triggering a secure message to the user equipment containing information associated with the characteristic violation;

dropping packets to or from the user equipment;
performing a connection re-establishment by performing DETACH procedure on the user equipment and further by performing an ATTACH procedure from the user equipment;
triggering an authentication procedure for the user equipment; and
turning on at least one of encryption or integrity protection;
wherein the receiving is performed during an ATTACH procedure between the user equipment and the network element.

* * * * *